(12) United States Patent
Baier et al.

(10) Patent No.: US 9,371,599 B2
(45) Date of Patent: Jun. 21, 2016

(54) FORMATION OF CONJUGATED PROTEIN BY ELECTROSPINNING

(71) Applicant: PepsiCo, Inc., Purchase, NY (US)

(72) Inventors: Stefan Baier, Hartsdale, NY (US); Peter Given, Ridgefield, CT (US); Kobsak Kanjanapongkul, Bangkok (TH); Jochen Weiss, Stuttgart (DE)

(73) Assignee: PepsiCo, Inc., Purchase, NY (US)

( * ) Notice: Subject to any disclaimer, the term of this patent is extended or adjusted under 35 U.S.C. 154(b) by 120 days.

(21) Appl. No.: 13/803,873

(22) Filed: Mar. 14, 2013

(65) Prior Publication Data

US 2013/0264731 A1 Oct. 10, 2013

Related U.S. Application Data

(60) Provisional application No. 61/619,996, filed on Apr. 4, 2012.

(51) Int. Cl.
| | |
|---|---|
| *D01D 5/06* | (2006.01) |
| *D01F 4/00* | (2006.01) |
| *D01F 9/00* | (2006.01) |
| *D01D 5/00* | (2006.01) |
| *A23J 3/08* | (2006.01) |

(52) U.S. Cl.
CPC ............... *D01D 5/0076* (2013.01); *A23J 3/08* (2013.01); *D01D 5/0038* (2013.01); *D01F 4/00* (2013.01); *D01F 9/00* (2013.01)

(58) Field of Classification Search
None
See application file for complete search history.

(56) References Cited

U.S. PATENT DOCUMENTS

| | | |
|---|---|---|
| 5,369,017 A | 11/1994 | Wong et al. |
| 5,854,391 A | 12/1998 | Wong et al. |
| 2005/0085624 A1 | 4/2005 | Birse |
| 2006/0222754 A1 | 10/2006 | Singer |
| 2008/0220042 A1 | 9/2008 | Hashi et al. |
| 2009/0035445 A1 | 2/2009 | Daubert |
| 2009/0053167 A1 | 2/2009 | DeFrees |
| 2009/0075354 A1 | 3/2009 | Reneker et al. |
| 2009/0136932 A1 | 5/2009 | Craighead et al. |
| 2009/0311407 A1* | 12/2009 | Lucey et al. .................. 426/573 |
| 2010/0080993 A1 | 4/2010 | Privitera et al. |
| 2010/0222546 A1 | 9/2010 | Crich et al. |
| 2011/0111012 A1* | 5/2011 | Pepper et al. ................. 424/445 |
| 2011/0189360 A1 | 8/2011 | Yoo et al. |

(Continued)

FOREIGN PATENT DOCUMENTS

| | | |
|---|---|---|
| GB | 1471398 | 4/1977 |
| WO | 9518232 A1 | 7/1995 |

(Continued)

OTHER PUBLICATIONS

Jiang et al., Optimization and Characterization of Dextran Membranes Prepared by Electrospinning, Biomacromolecules, vol. 5, No. 2, pp. 326-333, dated Mar.-Apr. 2004.

(Continued)

*Primary Examiner* — Mary F Theisen
(74) *Attorney, Agent, or Firm* — Brandon V. Zuniga; James R. Gourley; Carstens & Cahoon, LLP

(57) ABSTRACT

A method of preparing a polysaccharide-protein fiber by preparing an aqueous solution comprising a polysaccharide and a protein, applying a high voltage to the solution, collecting the fiber on a collecting plate.

19 Claims, 31 Drawing Sheets

(56) References Cited

U.S. PATENT DOCUMENTS

| | | | |
|---|---|---|---|
| 2011/0201242 A1 | 8/2011 | Hur et al. | |
| 2011/0236974 A1 | 9/2011 | Ogle et al. | |
| 2011/0311671 A1 | 12/2011 | Lin et al. | |

FOREIGN PATENT DOCUMENTS

| | | |
|---|---|---|
| WO | 1995018232 A1 | 7/1995 |
| WO | 2005000873 A1 | 1/2005 |
| WO | 2009126870 | 10/2009 |
| WO | 2011046423 A1 | 4/2011 |
| WO | 2011123760 | 10/2011 |
| WO | 2012030805 | 3/2012 |

OTHER PUBLICATIONS

PCT Application No. PCT/US13/30661, International Search Report and Written Opinion, dated May 22, 2013.

D.B. Khadka et al., "A Synthetic Polypeptide Electrospun Biomaterial," Applied Materials & Interfaces, 2011, 3, 2994-3001.

C. Schmitt et al., "Structure and Technofunctional Properties of Protein-Polysaccharide Complexes: A Review," Critical Review in Food Science and Nutrition, 38(8): 689-753 (1998).

C. M. Oliver et al., "Creating Proteins with Novel Functionality via the Maillard Reaction: A review," Critical Reviews in Food Science and Nutrition, 46:337-350 (2006).

S.K. Baier., "Conjugared Proteins: A Review," Research and Development, Frito-Lay.

C. Kriegel et al. "Fabrication, Functionalization, and Application of Electrospun Biopolymer Nanofibers," Critical Reviews in Food Science and Nutrition, 48:775-797 (2008).

K. Kanjanapongkul et al., "Formation of Whey Protein Isolate (WPI)-Dextran Conjugates in Nanofibers Produced by Electrospinning—A Feasibility Study," Department of Food Physics and Meat Science, Aug. 27, 2011.

Wang et al. Polymer Engineering and Science, Needleless Electrospinning of Nanofibers With a Conical Wire Coil, 2009.

Chinese Patent Application 201380023823.X, Office Action, dated Mar. 20, 2015.

Chinese Patent Application 201380020231.2, Office Action dated Jun. 2, 2015.

Lee et al, "Controlled Heparin conjugation on electrospun poly (-caprolactone)/gelatin fibers for morphology-dependent protein delivery and enhanced cellular affinity," Acta Biomaterialia, Elsevier, Amsterdam, NL, vol. 8, No. 7, Mar. 20, 2012, pp. 2549-2558, XP028511601, ISSN 1742-7061.

Yao et al, "Fabrication of zein/hyaluronic acid fibrous membranes by electrospinning," XP002748113, Abstract, Elsevier Science Publishers, Amsterdam, NL, Jun. 2007.

Y. D. Livney., "Milk proteins as vehicles for bioactives," Current Opinion in Colloid & Interface Science 15 (2010) 73-83.

J. S. Lillard et al., "Glycosylation and expanded utility of a modified whey protein ingredient via carbohydrate conjugation of low pH1,2," J. Diary Sci. (2009) 92:35-48.

W. Ritcharoen et al., "Electrospun dextran fibrous membranes," Cellulose (2008) 15:435-444.

H. Keypour et al., "Synthesis of Two Potentially Heptadentate (N4O3) Schiff-base Ligands Derived from Condensation of Tris(3-aminopropyl)-amine and Salicylaldehyde or 4-Hydroxysalicylaldehyde. Nickle(II) and Cooper(II) Complexes of the Former Ligand," Molecules 2002, 7, 140-144, ISSN 1420-3049, http://www.mdpi.org.

H. A. Patel et al., "Methods to determine denaturation and aggregation of proteins in low-, medium- and high-heat skim milk powders," Lait 87 (2007) 251-268, www.lelait-jounral.org.

C. P. Barnes et al., "Feasibility of Electrospinning the Globular Proteins Hemoglobin and Myoglobin," Journal of Engineered Fibers and Fabrics, vol. 1, Issue Feb. 2006.

D.B.Khadka et al., "A Synthetic Polypeptide Electrospun Biomaterial," Applied Materials & Interfaces, 2011, 3, 2994-3001.

J.A. Matthews et al., "Electrospinning of Collagen Nanofibers," Biomacromolecules 2002, 3, 232-238.

J. Weiss et al., "Electrospun fibers: Fabrication, functionalities and potential food industry applications," Woodhead Publishing Limited, 2012, 373-408.

C Schmit et al., "Stuctrue and Technofunctional Properties of Protein-Polysaccharide Complexes: A Review," Crtical Review in Food Science and Nutrition, 38(8): 689-753 (1998).

C. M. Oliver et al., "Creating Proteins with Novel Functionality via the Mailard Reaction:A review," Critical Reviews in Food Science and Nutrition, 46:337-350 (2006).

M. Hattori., "Functional Improvements in Food Proteins in Multiple Aspects by Conjugation with Saccharides: Case Studies of b-Lactoglobulin-Acisic Polysaccharides Conjugates," Food Sci. Technol. Res. 8 (4), 291-299, 2002.

C. Kriegel et al.,"Fabrication, Functionalization, and Application of Electrospun Biopolymer Nanofibers," Critical Reviews in Food Science and Nutrition, 48:775-797 (2008).

* cited by examiner

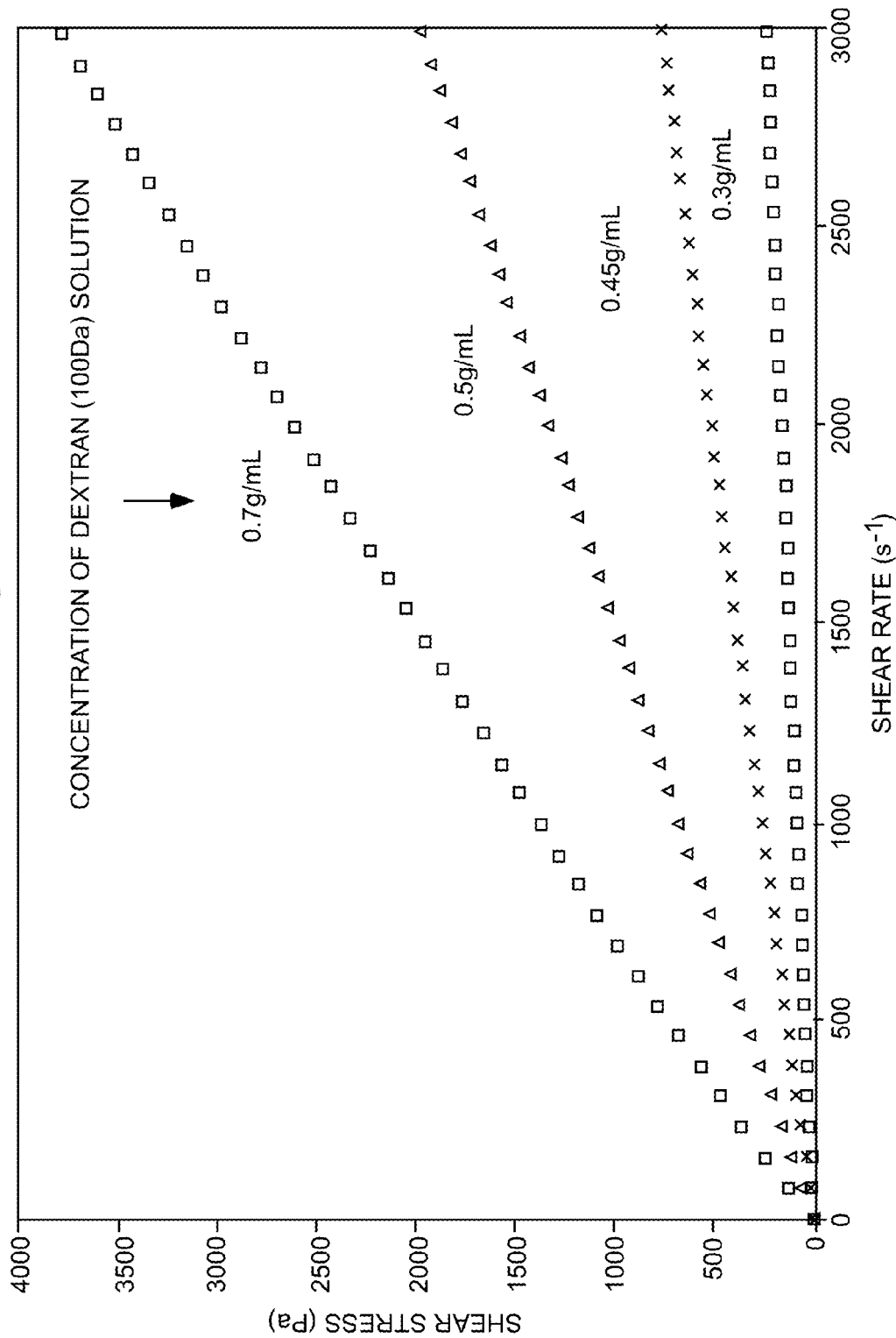

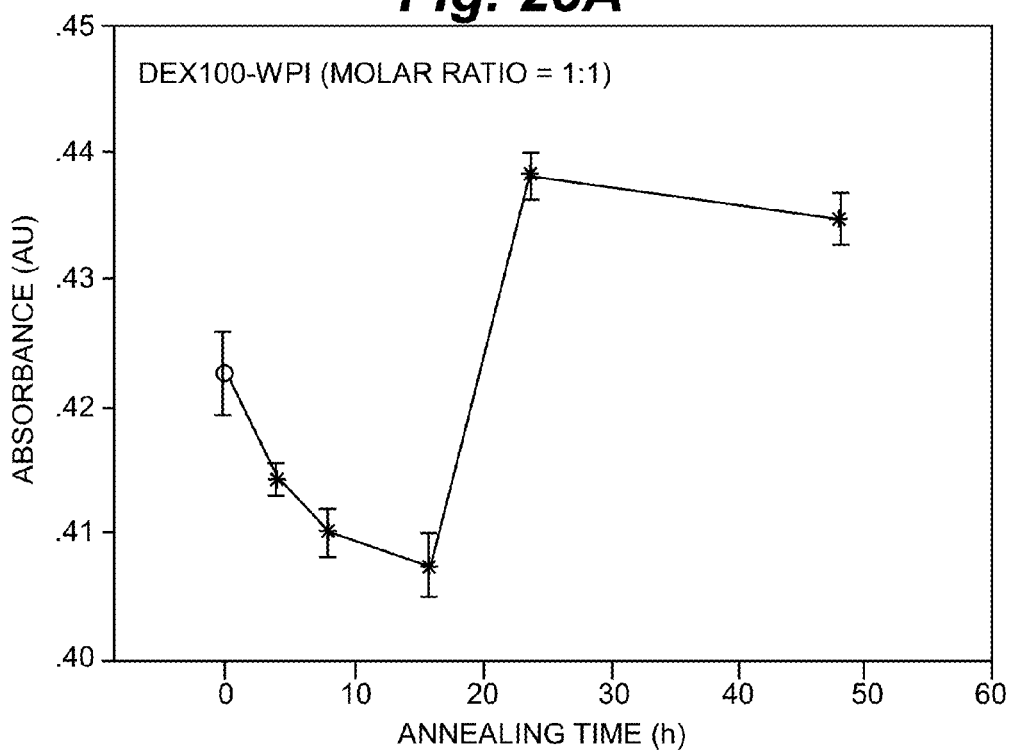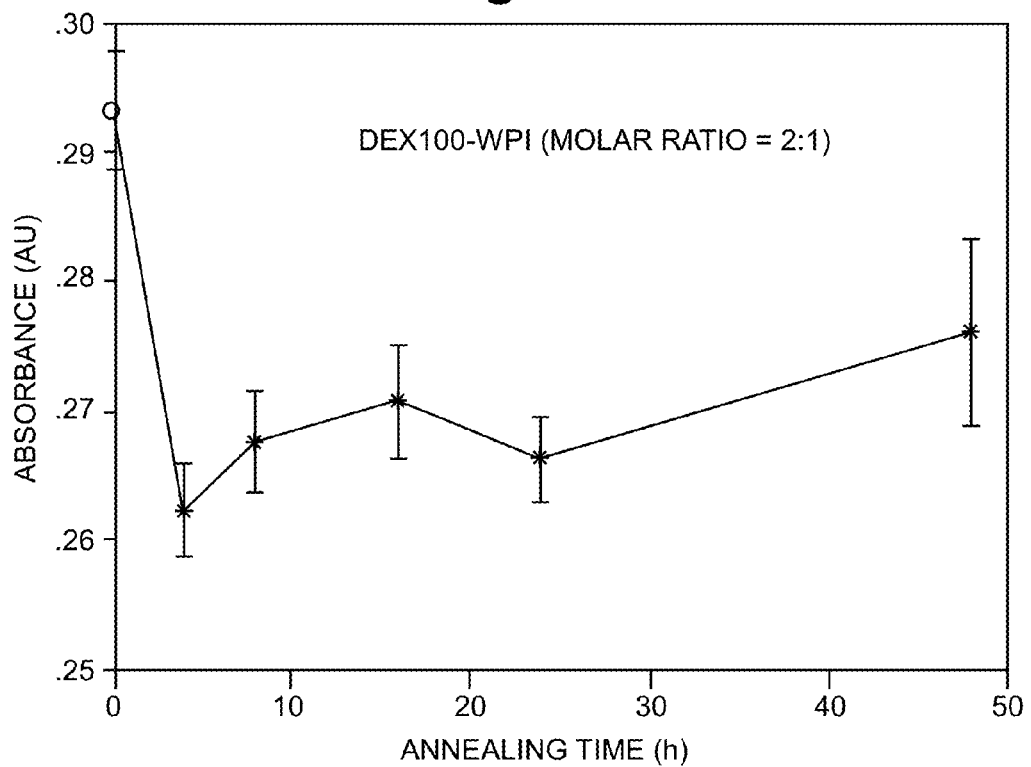

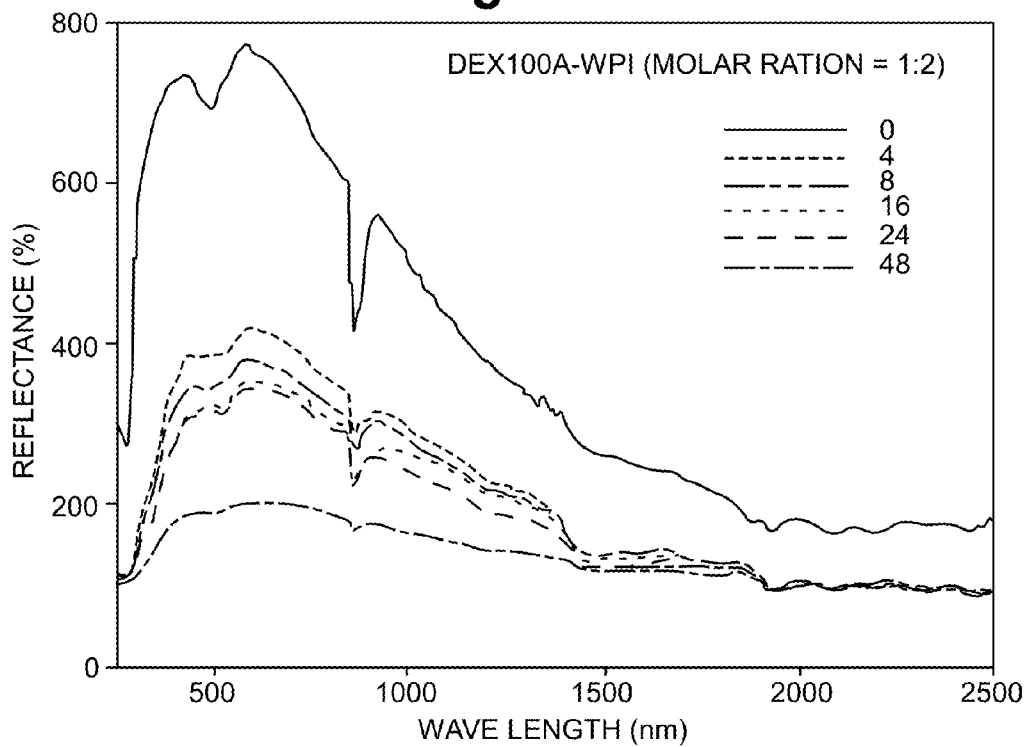
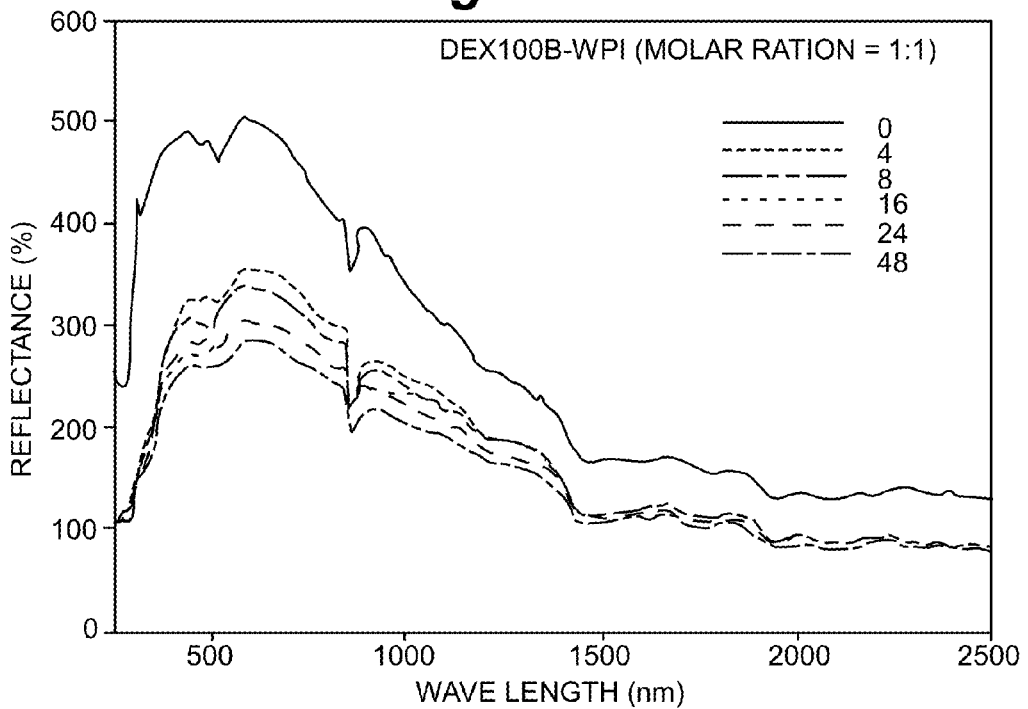

FORMATION OF CONJUGATED PROTEIN BY ELECTROSPINNING

CROSS-REFERENCE TO RELATED APPLICATIONS

This application claims priority to U.S. provisional application Ser. No. 61/619,996 filed Apr. 4, 2012, hereby incorporated by reference in its entirety.

BACKGROUND

Conjugated proteins, including protein-polysaccharide conjugates, play a significant role in the structure and stability of many processed foods. One reaction that is particularly important in the processed foods industry is the Maillard reaction. The Maillard reaction is a nonenzymatic chemical interaction involving the condensation of an amino group and a reducing group. The reaction results in the formation of intermediates that can later polymerize to form brown, nitrogen-containing compounds known as mellanoidins.

There are three major stages to the Maillard reaction. In the first stage, glycosylamine is formed then undergoes a rearrangement into an Amadori compound. In the second stage, the amine group is lost and a carbonyl intermediate is formed. The carbonyl intermediate undergoes dehydration or fission to form highly reactive carbonyl compounds. In the final phase, the reactive carbonyl compounds react with other constituents of the food product to form melanoidins.

Products of the Maillard reaction are associated with positive attributes such as aroma, taste, and color. However, the reaction can also lead to reduced nutritional value, shortened shelf-life, and formation of undesirable compounds resulting in an off-taste.

Controlling the Maillard reaction is therefore critical in developing foods with improved nutritional value. Previous ways of producing protein-conjugates have not been effective for a variety of reasons. For example, dry incubation, which uses a lyophilization process combined with heating, is slow and does not provide adequate yields. Consequently, there is a need for more effective ways of controlling the production of conjugated proteins.

SUMMARY

The features described herein generally relate to methods of using electrospinning to produce conjugated proteins. Aspects of the features described herein relate to methods of preparing dextran-conjugated whey proteins.

BRIEF DESCRIPTION OF THE DRAWINGS

The present disclosure is illustrated by way of example and not limited in the accompanying figures in which like reference numerals indicate similar elements and in which:

FIGS. 8A-8C illustrates Scanning Electron Microscope (SEM) images of dextran-whey protein isolate electrospun fibers prepared from various dextran sizes: 8A: 40 kDa, 8B: 70 kDa, and 8C: 100 kDa. Fiber diameters for the fibers in FIGS. 8A, 8B, and 8C are shown in FIGS. 8D, 8E, and 8F, respectively.

FIG. 9 illustrates stress-strain flow curves of aqueous dextran solutions at different concentrations.

FIGS. 11A-D illustrate SEM images of electrospun fibers prepared from dextran solutions at different concentrations (11A: 0.3 g/mL solvent, 11B: 0.45 g/mL solvent, 11C 0.6 g/mL solvent, and 11D: 0.7 g/mL solvent). Electrospinning conditions were kept constant at: voltage=20 kV, electrospinning distance=18 cm and solution flow rate=12 µL/min. Fiber diameters for the fibers in FIGS. 11A-D are shown in FIGS. 11E-H, respectively.

FIGS. 12A-E illustrates SEM images of electrospun fibers prepared from mixtures with different mixing ratios (by weight) of dextran (100 kDa) and whey protein isolate (12A: 1:0, 12B: 0.8:0.2, 12C: 0.75:0.25; 12D: 0.67:0.33, and 12E: 0.5:0.5). The concentration of all mixtures was 0.6 g/mL solvent and electrospinning conditions were kept constant at: voltage=20 kV, electrospinning distance=18 cm and solution flow rate=12 µL/min. Fiber diameters for the fibers in FIGS. 12A-E are shown in FIGS. 12F-J, respectively.

FIG. 17A is a protein stain. FIG. 17B is a glycoprotein stain. Lanes for both FIGS. 17A and B are Lane 1: WPI solution; lanes 2-5: electrospun WPI-dextran (40 kDa) film heated at 0, 8, 16, and 24 h, respectively; lanes 6-9: electrospun WPI-dextran (100 kDa) film heated at 0, 8, 16, and 24 h, respectively.

FIG. 18A is a protein stain. FIG. 18B is a glycoprotein stain. Weight ratio between dextran and WPI in all electrospun films was 3:1. Lane 1: protein ladder; lanes 2-5: electrospun films annealed at 60° C., 74% RH at 0, 8, 16 and 24 h, respectively.

FIG. 20A is a protein stain. FIG. 20B is a glycoprotein stain. Lane 1: as-spun film; lanes 2-10: electrospun films annealed at 60° C. but with different relative humidity: lanes 2-4=0% RH; lanes 5-7=44% RH; lanes 8-10=74% RH. Annealing times were 8 h: lanes 2, 5 and 8; 16 h; lanes 3, 6 and 9: 16 h; and 24 h lanes 4, 7 and 10. Lane 0 is standard protein ladder.

FIG. 21A is a protein stain. FIG. 21B is a glycoprotein stain. All electrospun films were annealed at 60° C. and 74% RH. Annealing times were: lanes 1, 5 and 9: as-spun films; lanes 2, 6 and 10: 8 h; lanes 3, 7 and 11: 16 h; lanes 4, 8 and 12: 24 h. Lane 0 is standard protein ladder. The dye used is specific to N-glycosides and which are not present in the protein or maltodextrin

FIG. 24A is 5 mg/mL and FIG. 24B is 3 mg/mL.

FIGS. 25A and 25B. shows the absorbance peak at 282 nm of electrospun samples prepared from mixtures of WPI and dextran 100 kDa at the mixing ratio of 1:1 (FIG. 25A) and 2:1 (FIG. 25B).

FIGS. 29 A and B illustrate the NIR spectra of electrospun films WPI-dextran 100 kDa.

DETAILED DESCRIPTION

Figure 1:
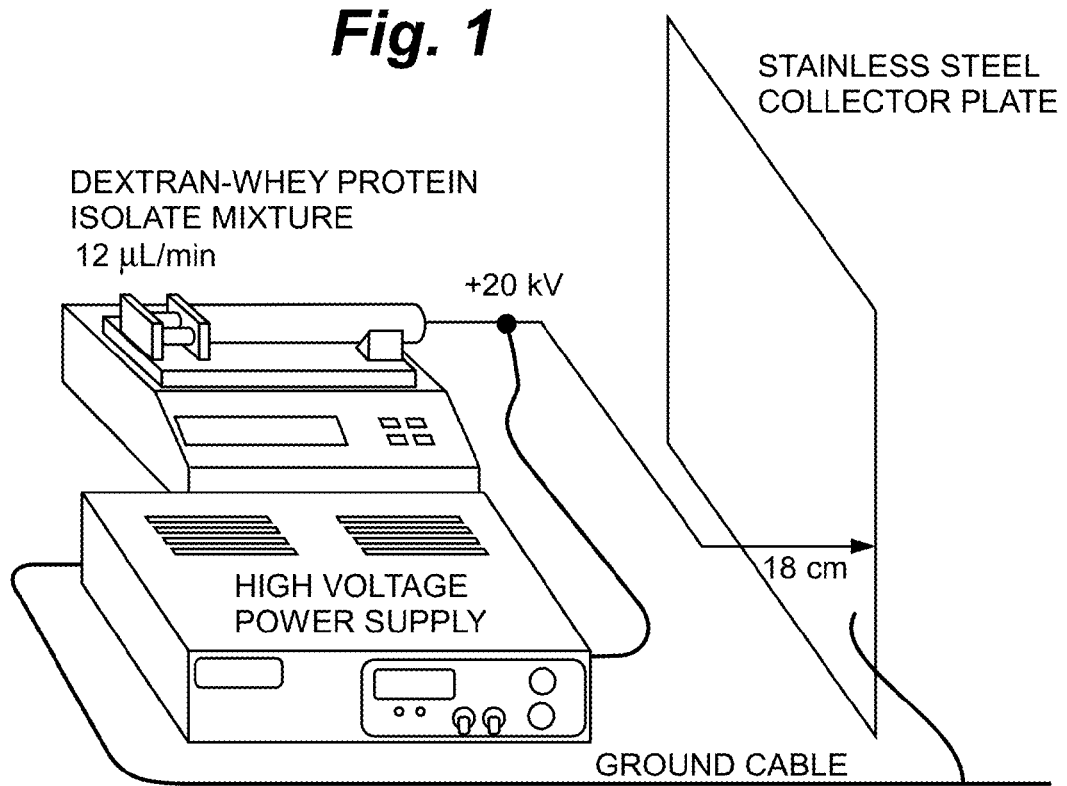
FIG. 1 illustrates an example electrospinning apparatus on which various features of the disclosure may be implemented.

In an aspect of the disclosure, methods are provided to produce conjugated proteins using an electro-spinning approach. In some aspects, the conjugate is a protein-carbohydrate conjugate (i.e a protein covalently linked to one or more carbohydrates). In some aspects, the conjugate is a protein-polysaccharide conjugate (i.e a protein covalently linked to one or more polysaccharides). In particular aspects, the polysaccharide is a dextran and the protein is a whey protein isolate (WPI).

a. Whey Proteins and Glycosylation

Whey proteins are key ingredients used in a wide variety of food products due to their excellent functionality (e.g. foam and emulsion stabilization) and their high nutritional content (e.g. high content of essential amino acids) [1].

Whey proteins are readily denatured during food processing due to intrinsically encountered environmental conditions, such as high temperature, pressure and/or presence of various acids. Improvement of whey protein stability has therefore been a key interest for food manufacturers in order to improve their use in food applications. Glycosylation between whey protein and dextran through the formation of Schiff base intermediate products has been proved to be an effective method to improve the proteins' heat stabilities [1] and emulsifying properties [3, 4].

Formation of protein-polysaccharide conjugates improved the freeze-thaw stability of the emulsion, even after three cycles of freezing-thawing at −18° C. for 22 hours and +40° C. for 2 hours [5].

Non-chemical glycosylation of protein and polysaccharide can be conducted by dry heating a mixture of protein powder and a powder containing reducing sugars at about 60° C. and a relative humidity of at least ~44% for up to 4 days [6]. In dry heating, rather than applying the heat directly to WPI and dextran in their initial powder form, solutions of WPI and dextran in liquid form are first prepared, followed by freeze drying to obtain a solid form of a mixture, which is more suitable for the subsequent glycosylation reaction.

An alternative method of glycosylating WPI is to heat dextran and whey protein isolate solutions at 60° C. and pH ~6.5 for 48 hours, so called wet-heating. See, for example U.S. Published Application 20090311407. Wet heating has a substantially shorter reaction time than dry-heating, and the advanced Maillard reaction products, which yield dark pigments are not as readily formed as in the dry heating method. Neither method has met with widespread use because of the expense involved and because both methods had low yields (<5%).

Electrospinning

Electrospinning is a form of electro-depositioning and is a versatile technique that can produce fibers from synthetic and/or natural polymers by using a high voltage electric field (e.g. 15 to 25 kV). Electrospinning may be with a needle or needleless. A typical electrospinning set up consists of a solution container equipped with a spinnerette, a collector plate used to collect the deposited fibers and a high voltage unit to generate electric fields between the spinneret and the collector plate. See FIG. 1. A solution container may be a syringe equipped with a conductive needle, which can be used both as a spinneret and an electrode.

The flow rate of the polymer solution can be controlled using a syringe pump. Once the polymer solution is electrically charged via an electrode, the shape of a polymer solution droplet at the spinneret tip will transform to a Taylor cone shape. If the voltage is high enough to overcome surface tension forces, thin polymer jets will be ejected from the Taylor's cone tip. The ejected polymer jets dry rapidly due to the small dimension of the jet, and dry solid fibers can be collected from a collector plate. The average diameters of electrospun fibers are typically around a few hundred nanometers.

Polymer chain entanglements are required to successfully electrospin a target solution into fibers. Polymer chain entanglements prevent polymer jets from breaking up due to electric stretching forces during electrospinning. If the polymer concentration is too low, polymer chain overlapping in the solution is absent. When the concentration increases to a critical concentration, c*, chain entanglement is initiated. The degree of chain entanglement depends on both polymer concentration and molecular weight, $(n_e)_{soln}$, and can be determined by Eq. 2.1 [12]:

$$(n_e)_{soln} = \frac{cM_w}{M_e}$$

where c is the polymer concentration in the solution, $M_w$ is the molecular weight of the polymer in the solution, and $M_e$ is the polymer entanglement molecular weight or the average molecular weight between entanglement junctions.

Eq. 2.1 establishes that the higher the polymer molecular weight, the lower the polymer concentration required in order to maintain a constant entanglement number, i.e., maintain electrospinnability of the solution.

Proteins and Carbohydrates/Polysaccharides

Whey protein is a key ingredient in food products. Whey proteins offer good foam and emulsion stability and also have a high content of essential amino acids. The preparation of whey proteins is known in the art. Typically, the milk cream is centrifuged to remove the cream or fat, then the caseins are precipitated allowing the whey proteins to be isolated by additional centrifugation, filtration and/or ion exchange steps. A typical whey protein isolate (WPI) may contain β-lactoglobulin (~55%), α-lactalbumin (~25%), immunoglobulin (~15%), bovine serum albumin (~4%) and lactoferrin (~2%).

While WPI is a preferred glycosylation target, a variety of proteins may be selected for electrospinning. In some aspects, only one type of protein is used. In other aspects, the protein may be a mixture of one or more proteins.

Any soluble animal or plant protein that can be electrospun and conjugated (reacted with saccharides) may be used. Suitable proteins include plant-based proteins, animal-based proteins, and microbial-based proteins. For example, suitable plant-based proteins may include Soy (Concentrate/Isolate), Pea (Concentrate/Isolate), Wheat (Gliadin, Gluten), Lentil, Beans, Corn (Zein), Oat, Barley, Amaranth, Rice, Buckwheat, Farro, Flaxseed, Quinoa, Rye, Sorghum, Teff, Sunflower, and Nuts (Peanuts, almonds, pecans). Suitable animal-based proteins may include Dairy (Whey and casein), Fish protein, Animal protein (Beef, pork, veal, poultry . . . ), and Egg protein. Suitable microbial-based proteins may include alga, funagal, and bacterial.

Carbohydrates having a reducing functional group may be utilized with the instant process. In particular, a suitable carbohydrate either has an aldehyde group or has the capability of forming an aldehyde in solution through isomerism. Suitable carbohydraes include agar, agarose, alginate, alginic acid, alguronic acid, alpha glucan, amylopectin, amylose, arabinogalactan, arabinoxylan, beta-glucan, BioCell collagen, callose, capsulan, carrageenan, cellodextrin, cellulin, cellulose, chitin, Chitin nanofibril, chitosan, chrysolaminarin, curdlan, cyclodextrin, DEAE-sepharose, dextran, dextrin, exopolysaccharide, alpha-cyclodextrin, Fibersol, ficoll, fructan, fucoidan, galactoglucomannan, galactomannan, gellan gum, glucan, glucomannan, glycocalyx, glycogen, hydrolyzed guar, guar gum, gum arabic, hemicellulose, homopolysaccharide, hypromellose, icodextrin, inulin, inulose, kefiran, konjac, laminarin, lentinan, levan lichenin, locust bean gum, MatrixDB, mixed-linkage, lucan, modified starch, mucilage, natural gum, oxidized cellulose, paramylon, pectic acid, pectin, pentastarch, pleuran, polydextrose, polyglycol alginate, polysaccharide, polysaccharide peptide, porphyran, pullulan, schizophyllan, sepharose, sinistrin, sizofiran, soy fiber, sugammadex, unhydrolysable glucose polymers, welan gum, xanthan gum, xylan, xyloglucan, yucca or yucca/quillaia extracts, and zymosan.

A particular category of suitable carbohydrates is polysaccharides.

Saccharides such as polysaccharides are polymers of saccharides. Oligosaccharides are polymers of 2-200 saccharides. Polysaccharides are longer polymers than oligosaccharides. Suitable polysaccharides may be polymers of 201 to 2500 saccharides.

Suitable polysaccharides include dextrans. A dextran means a complex, branched polysaccharide comprising multiple glucose molecules joined into chains of varying lengths (e.g, from 10 to 150 kDa). The straight chain consists of α1→6 glycosidic linkages between glucose molecules. The branched chain may contain α1→4 linkages, α1→2 linkages and/or α1→3 linkages.

Saccharides (sugar types) suitable for conjugation conformation include reducing monosaccharides such as glucose, fructose, glyceraldehyde and galactose. Many disaccharides, like lactose and maltose, also have a reducing form, as one of the two units may have an open-chain form with an aldehyde group. In glucose polymers such as starch and starch-derivatives like glucose syrup, maltodextrin and dextrin the macromolecule begins with a reducing sugar, a free aldehyde. More hydrolyzed starch contains more reducing sugars. The percentage of reducing sugars present in these starch derivatives is called dextrose equivalent (DE).

In some embodiments, the carbohydrates, such as dextrans, have a molecular weight range between about 10 kDa and about 500 kDa. In other embodiments, the dextrans have a molecular weight range between about 40 kDa and about 100 kDa, or between about 70 kDa and about 100 kDa.

"About," as used herein, means+/−10% of the numerical value.

Any suitable electrospinning methods and devices may be used so long as the following are provided: a high power voltage supply, a reservoir for the polymer solution, electrodes (one grounded), and a receiver plate. Suitable electrospinning devices include, but are not limited to, Needle-less and Near Field.

Electrospinning provides substantial advantages over the previous methods of conjugating proteins. The present electrospinning method facilitated glycosylation in much shorter annealing times, and with a greater yield.

In electrospun WPI-dextran fibers, for example, the physical state of the two polymers is such that a higher molecule-to-molecule larger contact number is achieved for at least three reasons. First, the polymers are more uniformly distributed since electrospinning causes a molecular alignment due to stretching and bending motions. Second, a phase separation is prevented because of the rapid evaporation of solvent. Finally, the small diameters of fibers results in a densely packed fiber composed of WPI and dextran molecules.

Thus, without being bound by theory it is thought that the electrospinning process causes molecules to be well aligned and that stay intact due to polymer chain entanglements, resulting in particularly good yield and reduced cost.

A variety of parameters may be varied to optimize fiber formation during electrospinning Parameters that affect fiber formation include the dextran concentration, mixture viscosity, protein-to-polysaccharide ratio in the mixture, time allowed for annealing.

The following description focuses on one aspect of the invention, namely dextran-whey protein. It is to be understood that the process can be extended to any suitable protein and carbohydrate.

i. Dextran Concentration and Fiber Formation

Dextran was responsible for the electrospinnability of dextran-whey protein mixtures while simultaneously serving as the reducing sugar reagent for the conjugate formation.

A wide range of dextran molecular weights from 10-440 kDa have been used to form conjugates with proteins. Lower molecular weights typically give higher levels of conjugates. For electrospinning, high concentrations are required when low molecular weight polymers are used. Unfortunately, high concentrations result in highly viscous solutions, which are not capable of electrospinning.

The ability of dextran to form fibers is related to dextran concentration and size. All dextran (Mw=100 kDa) solutions with the concentration down to 0.45 g/mL exhibited shear thinning flow behaviors. For 100 kDa dextran, smooth and continuous fibers required a concentration of 0.1 g/mL or higher or 0.6 g/mL or higher. Thus, in some aspects for 100 kDa dextran, the mixture for electrospinning contains at least 0.6 g/mL, at least 0.8 g/mL, or at least 1.0 g/mL dextran. An upper limit for dextran may be determined by the viscosity of the mixture and depends on the type of polymers such as 5 g/mL.

The protein and polysaccharide may be combined in a buffer for electrospinning. For example, the mixture for electrospinning may be prepared in phosphate buffer. The pH of the buffer is between 6.0 and 7.0; typically, the buffer pH is 6.50±0.07.

ii. Viscosity

Viscosity is an important parameter for efficient electrospinning. When viscosity is too high, electrospinning efficiency is negatively impacted. For example, viscosity for a solution prepared from 40 kDa dextran was about 1.8 Pa·s (Poises). This level of viscosity was a disadvantage for several reasons. First, solution preparation was difficult because the solution became "sticky." Second, a thick layer of foam formed during solution preparation due to high content of protein in the mixture (0.25 g/mL solvent). The solvent may be any suitable solvent in which the polymer may be dissolved. Ideally the solvent should rapidly evaporate and should not be flammable. A suitable solvent is water. A long relaxation time was therefore required to remove the foam layer from the mixture. Moreover, clogging took rapidly place during the electrospinning, resulted in the lowest observed productivity.

Viscosity may be measured by any suitable method using any suitable viscometers and rheometers such as, but not limited to, a Brookfield Viscometer. Generally the viscosity should be along a desired flow curve and is not limited to any single value.

In contrast, a solution prepared from 100 kDa dextran—the largest dextran tested—had the lowest viscosity. The lower viscosity eased solution preparation, decreased foam layer formation, reduced clogging frequency.

Suitable viscosities may be obtained by using dextran sizes above 40 kDa. For example, such mixtures may contain dextrans between 50 kDa and about 100 kDa. In aspects, mixtures of dextran sizes between 50 kDa and about 100 kDa may be used to obtain the desired viscosity levels. In particular aspects, the dextran has a molecular weight about 100 kDa.

iii. Fiber Size and Formation

It is believed that conjugation of polysaccharide to the protein is enhanced when bead formation is reduced or eliminated. Beads are considered a defect and hence undesirable. Fibers with little or no beads are preferred. In aspects of the disclosure, the fibers contain no beads as determined by Scanning Electron Microscopy.

Fiber diameter may affect conjugation. Smaller diameters of fibers results in a densely packed fiber composed of WPI and dextran molecules. Conjugation is promoted by dense packing of the WPI and dextran molecules. In some aspects, fiber diameter in some aspects is about 100 nm and about 500 nm. In other aspects the fiber diameter is about 100 nm and about 300 nm. In yet other aspects, fiber diameter is between about 150 nm and about 250 nm. Fiber diameter may be measured as described in Example 1.

iv. Mixing Ratio of Protein and Dextran

Protein content of the fiber also affects both fiber formation and conjugation. When the protein content of the mixture increases, fiber diameter decreases. See, for example, Example 7. When the protein content was raised to 33% wt or higher, beads were formed. Thus, to reduce or eliminate beading on fibers, protein content in the mixing solution may be up to about 25% wt. To obtain these percentages, the mixing ratio (weight/weight) of polysaccharide to protein in the aqueous solution used for electrospinning may be as in Table 1.

TABLE 1

Correspondence between dextran, protein, and bead formation

| Mixing Ratio (Dextran:WPI; w/w) | % WT Protein | Beads |
| --- | --- | --- |
| 1:0 | — | None |
| 4:1 | 20% | None |
| 3:1 | 25% | None |
| 2:1 | 33% | + |
| 1:1 | 50% | ++ |

Additional details regarding protein content in films is given in Table 9.

Formation of glycoprotein, measured by gel electrophoresis is enhanced when the ratio of dextran:WPI increases. For example, Thus, to achieve good fiber formation and conjugation the mixing ratio of polysaccharide to protein is above 2:1. In some aspects, the ratio is about 3:1, about 4:1, or about 5:1. Accordingly in particular aspects the range of ratios may be about 3:1 to about 10:1. In other aspects, the ratio may be about 3:1 to about 4:1.

iv. Annealing Conditions

Electrospinning brings molecules close together. Then annealing provides a temperature induced reaction between the molecules. Annealing, as used herein, is the conjugation process whereby covalent bonds are formed between the protein and the polysaccharide. Annealing may be enhanced by using a prolonged incubation period. For example, the annealing time may have a lower limit 2 hours, 4 hours, 6 hours, 8 hours, 10 hours, 12 hours, 14 hours, 16 hours, 18 hours, or 24 hours. Annealing time may have an upper limit of 4 hours, 6 hours, 8 hours, 10 hours, 12 hours, 14 hours, 16 hours, 18 hours, 24 hours, or 28 hours. Often annealing time is between 2 hours and 4 hours. The color of films became slightly darker when longer annealing times were used especially when films were annealed for more than 24 hours.

v. Effect of Dextran Size on Conjugation

Glycosylation was slower when dextran with 100 kDa was used to prepare electrospun film. However, the size of glycoproteins formed between WPI and dextran 100 kDa was larger than ~280 kDa while that formed from WPI and dextran with 40 and 70 kDa were larger than ~70 and ~200 kDa, respectively.

vi. Effect of Humidity on Glycosylation

The methods may be performed at particular humidity levels to enhance glycosylation. Higher humidity may enhance glycosylation, as determined by the more intense of glycoproteins band observed in glycoprotein-stained gel. There was much less intensity of glycosylation bands in glycoprotein-stained gel when samples were annealed under low humidity. Enhanced glycosylation was obtained at 74% RH (FIGS. 20A and B; Lanes 8-10) compared to 0% RH (FIGS. 20A and B; Lanes 2-4) and 44% RH (FIGS. 20A and B; Lanes 5-7). Thus, in some aspects, the relative humidity is at least 44%. In other aspects, the relative humidity is between 45% and 75% or 65% and 75%; in yet other aspects, the relative humidity is 70% to 80%.

The temperature is typically about room temperature; however, any suitable temperature between 10° C. and 70° C. is contemplated.

a. Assessing Conjugation

The appearance of WPI-Dextran conjugates may be monitored by any suitable approach. For example, gel electrophoresis may be a preferred way to verify the presence of glycoprotein in annealed electrospun films. FTIR did not clearly show a difference between IR spectra from as-spun films and annealed films and may therefore be less useful.

REFERENCES

1. Jiménez-Castaño, L., M. Villamiel, and R. López-Fandiño, Glycosylation of individual whey proteins by Maillard reaction using dextran of different molecular mass. Food Hydrocolloids, 2007. 21(3): p. 433-443.
2. Livney, Y. D., Milk proteins as vehicles for bioactives. Current Opinion in Colloid and Interface Science, 2010. 15(1-2): p. 73-83.
3. Zhu, D. A. N., S. Damodaran, and J. A. Lucey, Physicochemical and emulsifying properties of whey protein isolate (WPI)-dextran conjugates produced in aqueous solution. Journal of Agricultural and Food Chemistry, 2010. 58(5): p. 2988-2994.
4. Kato, A., K. Minaki, and K. Kobayashi, Improvement of emulsifying properties of egg white proteins by the attachment of polysaccharide through maillard reaction in a dry state. Journal of Agricultural and Food Chemistry®, 1993. 41(4): p. 540-543.
5. Xu, D., et al., The effect of whey protein isolate-dextran conjugates on the freeze-thaw stability of oil-in-water emulsion. Journal of Dispersion Science and Technology, 2011. 32(1): p. 77-83.
6. Jiménez-Castaño, L., et al., Effect of the dry-heating conditions on the glycosylation of β-lactoglobulin with dextran through the Maillard reaction. Food Hydrocolloids, 2005. 19(5): p. 831-837.
7. Zhu, D., S. Damodaran, and J. A. Lucey, Formation of whey protein isolate (WPI)-dextran conjugates in aqueous solutions. Journal of Agricultural and Food Chemistry, 2008. 56(16): p. 7113-7118.
8. Akhtar, M. and E. Dickinson, Emulsifying properties of whey protein-dextran conjugates at low pH and different salt concentrations. Colloids and Surfaces B: Biointerfaces, 2003. 31(1-4): p. 125-132.
9. Lillard, J. S., D. A. Clare, and C. R. Daubert, Glycosylation and expanded utility of a modified whey protein ingredient via carbohydrate conjugation at low pH. Journal of Dairy Science, 2009. 92(1): p. 35-48.
10. Nie, H., et al., Effect of poly(ethylene oxide) with different molecular weights on the electrospinnability of sodium alginate. Polymer, 2009. 50(20): p. 4926-4934.
11. Jiang, H., et al., Optimization and characterization of dextran membranes prepared by electrospinning Biomacromolecules, 2004. 5(2): p. 326-333.
12. Shenoy, S. L., et al., Role of chain entanglements on fiber formation during electrospinning of polymer solutions: Good solvent, non-specific polymer-polymer interaction limit. Polymer, 2005. 46(10): p. 3372-3384.
13. Ritcharoen, W., et al., Electrospun dextran fibrous membranes. Cellulose, 2008. 15(3): p. 435-444.
14. Deitzel, J. M., et al., The effect of processing variables on the morphology of electrospun nanofibers and textiles. Polymer, 2001. 42(1): p. 261-272.
15. Kanjanapongkul, K., S. Wongsasulak, and T. Yoovidhya, Investigation and prevention of clogging during electrospinning of zein solution. Journal of Applied Polymer Science, 2010. 118(3): p. 1821-1829.
16. Keypour, H., S. Salehzadeh, and R. V. Parish, Synthesis of two potentially heptadentate (N4O3) Schiff-base ligands derived from condensation of tris(3-aminopropyl)-amine and salicylaldehyde or 4-hydroxysalicylaldehyde. Nickel (II) and copper(II) complexes of the former ligand. Molecules, 2002. 7(2): p. 140-144.
17. Amsden, J. J., et al., Different structural changes occur in blue- and green-proteorhodopsins during the primary photoreaction. Biochemistry, 2008. 47(44): p. 11490-11498.
18. Etzel, M. R. and T. Bund, Monoliths for the purification of whey protein-dextran conjugates. Journal of Chromatography A, 2011. 1218(17): p. 2445-2450.
19. Patel, H. A., et al., Methods to determine denaturation and aggregation of proteins in low-, medium- and high-heat skim milk powders. Dairy Science and Technology, 2007. 87(4-5): p. 251-268.
20. Aït Kaddour, A., et al., Physico-chemical description of bread dough mixing using two-dimensional near-infrared correlation spectroscopy and moving-window two-dimensional correlation spectroscopy. Journal of Cereal Science, 2008. 48(1): p. 10-19.
21. Pan, B., et al., Study on interaction between gold nanorod and bovine serum albumin. Colloids and Surfaces A: Physicochemical and Engineering Aspects, 2007. 295(1-3): p. 217-222.
22. Izutsu, K. I., et al., Near-infrared analysis of protein secondary structure in aqueous solutions and freeze-dried solids. Journal of Pharmaceutical Sciences, 2006. 95(4): p. 781-789.
23. Segtnan, V. H. and T. Isaksson, Temperature, sample and time dependent structural characteristics of gelatine gels studied by near infrared spectroscopy. Food Hydrocolloids, 2004. 18(1): p. 1-11.

The disclosures of patents, published applications, and journal articles cited above are hereby incorporated by reference.

Example 1

Materials and Methods a. Dextrans

Dextrans with average molecular weight of about 40, 70 and 100 kDa, produced by *Leuconostoc* spp., were purchased from Sigma-Aldrich (Steinheim, Germany). BIPRO® whey protein isolate was supplied from Davisco Food International, Inc. All materials were used without further purification.

Dextran powder and/or whey protein isolate at various mixing ratios (1:0, 0.8:0.2, 0.75:25, 0.67:0.33 and 0.5:0.5 by weight) were dissolved in 30 mM phosphate buffer solution. The solution was stirred on a magnetic stirrer overnight at room temperature (~22° C.) to ensure a complete dissolution of the mixture. The solution viscosity, conductivity, density and pH were measured using a rheometer (Physica, MCS 300, Ashland, Va.), a microprocessor conductivity meter (WTW, LF537, Weiheim, Germany), a density meter (Anton Paar, DMA 35N, Graz, Austria) and a pH meter (WTW, Inolab, Weiheim, Germany), respectively. Final pH of all solutions was 6.50±0.07, which was previously reported as a suitable pH for whey protein isolate-dextran conjugates formation [7].

b. Electrospinning

The electrospinning set up is shown in FIG. 1. The target solution was loaded into a 10-mL glass syringe equipped with a stainless steel needle (inner diameter of 0.9 mm). The syringe was then loaded into a syringe mounted on a syringe pump (Harvard Apparatus 11P, Holliston, Mass.). The needle tip was connected to a high voltage D.C. power supply (Gamma High Voltage, ES30P-5W, Ormond Beach, Fla.). The grounded electrode was connected to a stainless steel collector plate. The distance between the needle tip and the collector plate was maintained at 18 cm. The solution flow rate was kept constant at 12 µL/min. The solution was electrically charged at about +20 kV. The collected electrospun films were frozen at −28° C. before further investigations.

Typically the voltage during electrospinning is 15 to 20 kV and not above 25 kV. If the voltage is too high, there will be arcing (sparks). The amperage is increased until fiber formation is achieved.

c. Morphology Analysis

The electrospun fibers were investigated for their morphology using a ZEISS ORIGA cross-beam field emission scanning electron microscope with focused ion-beam (Oberkochen, Germany). The films were vacuum-dried and gold sputter-coated for about 4 minutes. The average diameters of the electrospun fibers were determined by image analysis using Image J (National Institutes of Health, Bethesda, Md.).

d. Film Characterization by FTIR

The electrospun films were investigated through the use of a Fourier transform infrared spectrometer equipped with a universal attenuated total reflectance (ATR-FTIR) accessory (Perkin Elmer, Spectrum 100, Beaconsfield, UK). The infrared spectra were collected within a wavelength range of 4000-650 cm$^{-1}$, with a 4 cm$^{-1}$ resolution and 10 scans, in transmission mode.

e. SDS-PAGE Gels

TGX pre-cast gels (Tris-HCl Gel, 4-20% linear gradient, 15 wells) and protein staining-destaining solutions (Bio-Safe Coomassie Stain and Coomassie Destain) were purchased from Bio-Rad Laboratories. Standard protein ladder (PageRuler™ Plus Prestained Protein Ladder 26619, 10-250 kDa) and glycoprotein staining kit (Pierce® Glycoprotein Staining Kit) were purchased from Thermo Scientific, Pierce Biotechnology (Germany). The standard protein ladder was kept at −28° C. before used. Potassium carbonate (KCO3) and sodium chloride (NaCl) were purchased from Sigma-Aldrich (Steinheim, Germany).

f. Heat Treatment

About 5-10 mg of electrospun films were placed in a controlled humidity chamber. The chamber was pre-equilibrated in a hot-air oven (Memmert, Model 400, Schwabach, Germany) to allow the control volume to reach equilibrium temperature at 60° C. The relative humidity inside the control volume was about 0% RH (using silica gel), 44% RH (using saturated KCO3 solution) or 74% RH (using saturated NaCl solution).

Annealing provides conjugation of the protein and saccharide followed by a Malliard Reaction.

g. Analysis of WPI-Dextran Conjugate Interaction Studied by SDS-PAGE

Sample buffer was prepared by dissolving all chemical compounds listed in Table 2 in deionized distilled water to the final volume of 100 mL and frozen at −20° C. before use.

TABLE 2

Composition of sample buffer (200 mL)

| Material | Quantity |
|---|---|
| Tris(hydroxymrthyl)-aminomethane | 9.085 g |
| Hydrochloric (conc.) | 1.250 g |
| SDS | 6.2 g |
| Glycerin 20% | 40 mL |
| 2-mercaptoethanol | 6 mL |
| Bromophenol blue | 0.4 g |

Electrode buffer was prepared by dissolving the compounds listed in Table 3 in deionized distilled water to a final volume of 5000 mL. The buffer was stored at 4° C. before use.

TABLE 3

Composition of electrode buffer (1000 mL)

| Material | Quantity |
|---|---|
| Tris(hydroxymrthyl)-aminomethane | 3 g |
| SDS 10% | 10 mL |
| Glycine | 14.4 g |

Samples were prepared for gel electrophoresis using a modified approach from the method previously described by Zhu et al. (2008). First, heat-treated electrospun films were dissolved in deionized distilled water at a concentration of 80 µg (of protein content)/15 µL. The aqueous solution was centrifuged at 16000 g for 15 min at 22° C. The supernatant was collected and further diluted with sample buffer to a final protein concentration of 40 µg/15 µL. The diluted solution was then heated at 95° C. in water bath for at least 5 min to break disulfide bonds and dissociate proteins (reducing conditions). The solution was then kept cooled.

h. Gel Electrophoresis

SDS-PAGE was performed on a Mini-PROTEAN Tetra Cell according to Laemmli (1970). Reducing SDS-PAGE analyses were carried out on TGX pre-cast gels (Tris-HCl Gel, 4-20% linear gradient, 15 wells, Bio-Rad Laboratories). 10 µL/well of sample solution was loaded into each well. Electrophoresis was run for about 40 min at a constant voltage of 200 V at room temperature. Two gels were run at the same time. After electrophoresis, one gel was stained for protein and another was stained for glycoprotein to detect the presence of WPI-dextran conjugates.

For protein staining, gels were stained for protein and destained with Bio-Safe Coomassie Stain and Coomassie Destain (Bio-Rad, Laboratories), respectively. The staining process was carried out according to the manufacture's instruction. Briefly, the gels were washed with an excess amount of deionized distilled water and transferred to the staining container where the Bio-Safe Coomassie Stain was added to completely cover gels for at least 1 hour. Then gels were destained in Coomassie Destain over night at room temperature.

For glycoprotein staining, Pierce® Glycoprotein Staining Kit (Thermo Scientific, Pierce Biotechnology) was used. Gels were fixed in 100 mL of 50% methanol for 30 minutes and washed by gently agitating with 100 mL of 3% acetic acid for 10 minutes two times. Then gels were immersed in oxidizing Solution for 15 minutes, washed in 100 mL 3% acetic acid for 5 minutes (3 times), stained with Glycoprotein Staining Reagent for 15 minutes and transferred to the reducing solution for 5 minutes, under gentle agitation. Finally, gels were washed with an excess amount of 3% acetic acid followed by washing with deionized distilled water.

i. Study of Color Development During Annealing Using UV-Visible Spectroscopy

Annealed electrospun films were dissolved in deionized distilled water to a concentration of 5 mg/mL. The solution was shaken vigorously using a vortex for about two minutes and kept still for about twenty minutes and then it was shaken again using a vortex to ensure a complete dissolution. All solutions were used immediately after preparation.

j. UV-Spectroscopy

UV measurements were carried out on a UV-VIS-NIR Spectrometer with 60 mm internal sphere (PerkinElmer, Lambda 750S, Germany). 1 mL of sample solution was loaded into a semi-micro cuvette (Brand, PLASTIBRAND®, Germany). The sample was used for a wavelength scan from 250 to 350 nm and the presence of conjugates was observed at around 280 nm.

k. NIR Spectra of as-Spun and Annealed Electrospun Films

NIR spectra of ultrafine-fibrous mats prior to and after heat treatment were investigated using a UV-VIS-NIR Spectrometer with 60 mm internal sphere (PerkinElmer, Lambda 750S, Germany). The spectra were collected over a wavelength range of 250-2500 $cm^{-1}$ in reflectance mode, with a 4 $cm^{-1}$ resolution.

Example 2

Preparing Electropun Fibers from Dextran

Dextrans with average molecular weight of about 40, 70 and 100 kDa were electrospun and the morphology of the resulting fibers were investigated as described in Example 1 i. 70 kDa Dextran

Figure 2:
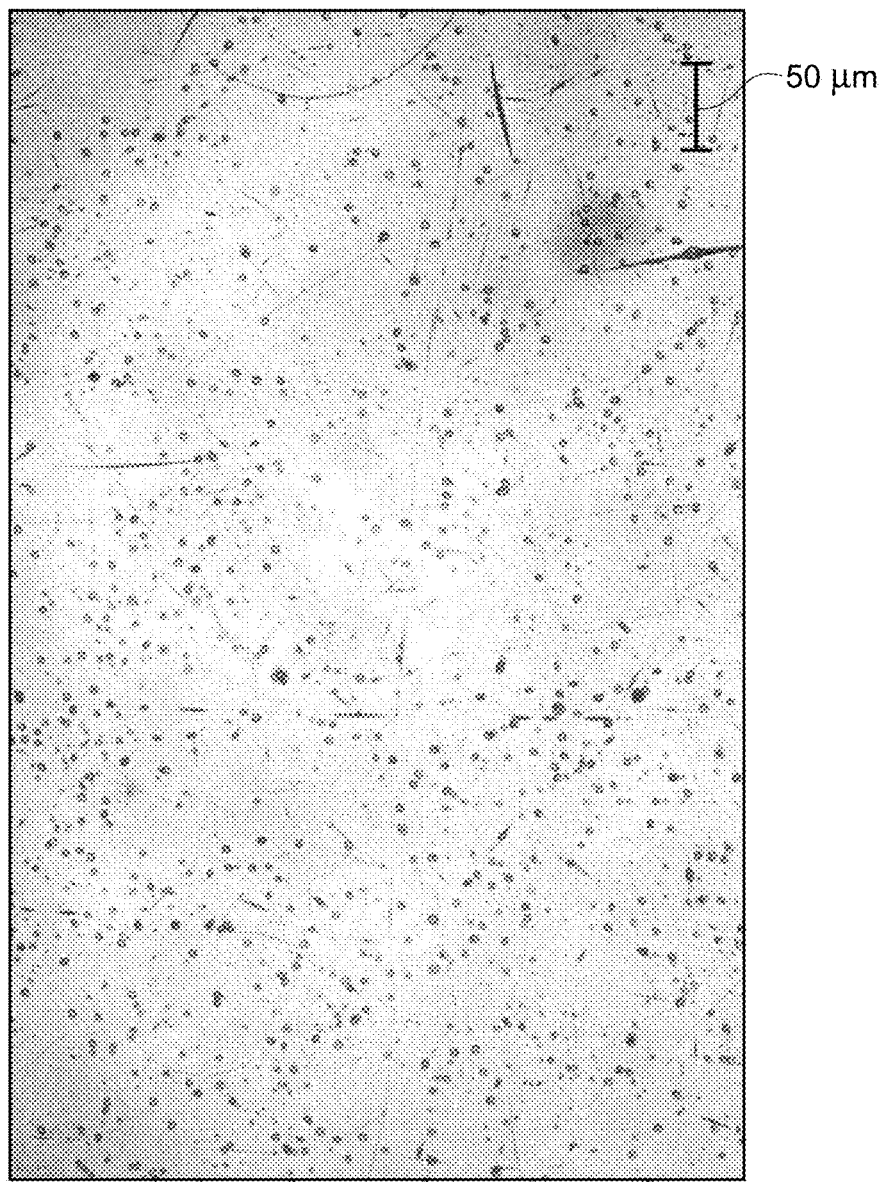
FIG. 2 illustrates beads on fibers with dextran (70 kDa) at 0.5 g/mL solvent.
Figure 3:
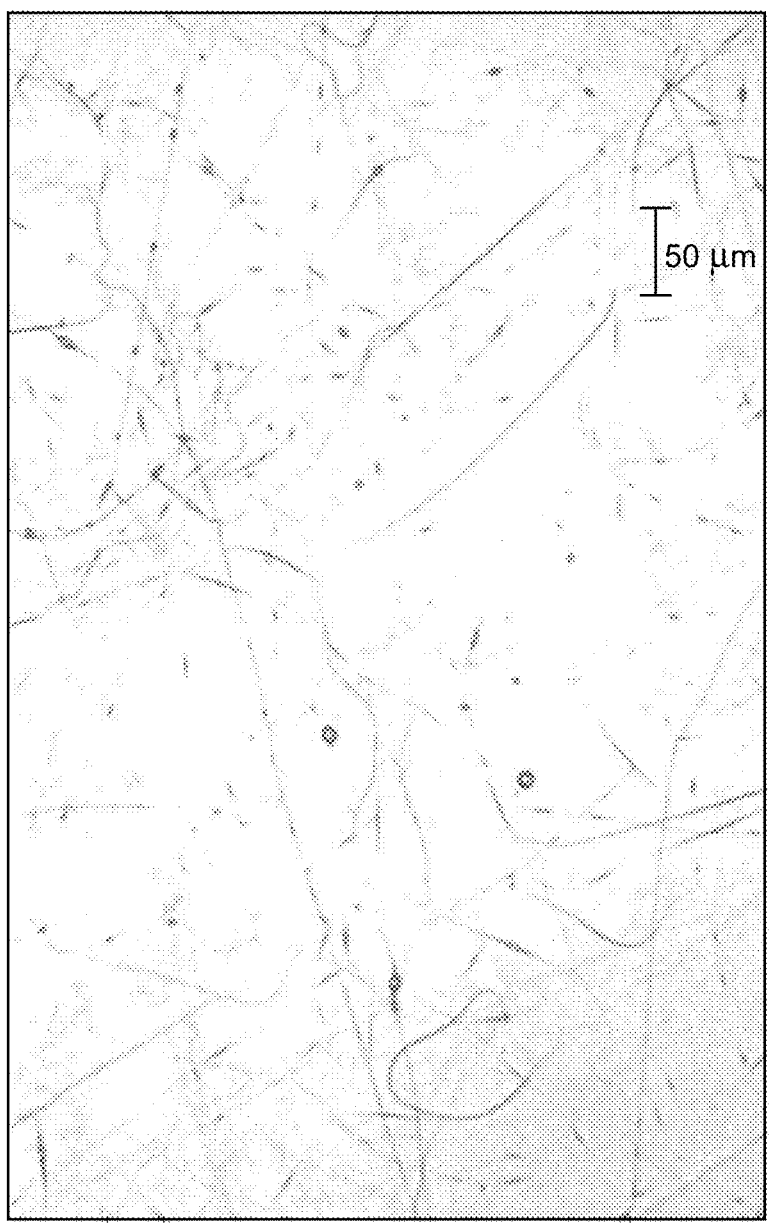
FIG. 3 illustrates fibers prepared from a solution of dextran (70 kDa) at 0.7 g/mL solvent.
Figure 4:
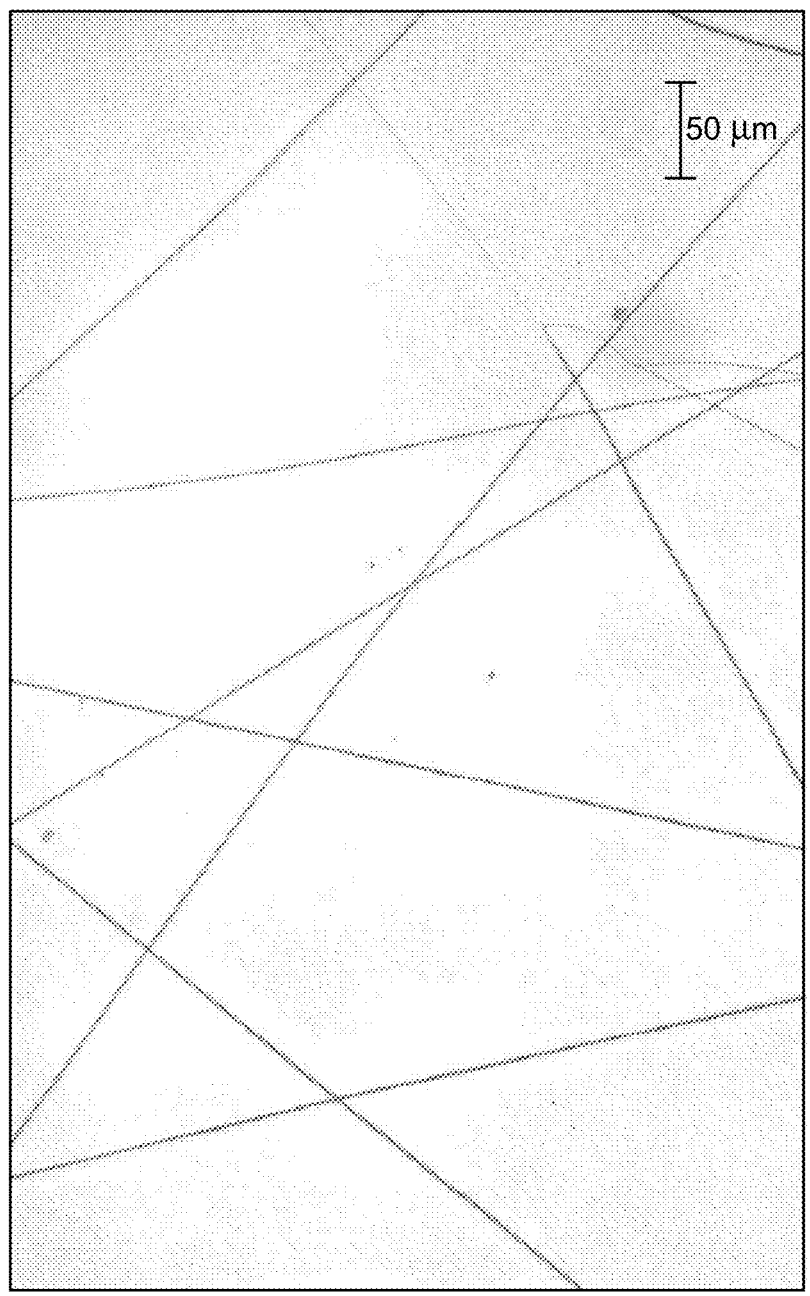
FIG. 4 illustrates smooth fibers prepared from a solution of dextran (70 kDa) at 0.8 g/mL solvent.

Dextran (70 kDa) gave a variety of morphologies depending on the concentration. At 0.5 g/mL (~33% w/w) beads were mainly produced with some short fibers (FIG. 2). Increasing the concentration to 0.7 g/mL (~41% w/w) resulted in fewer beads and continuous fibers (FIG. 3). Further increase in the dextran concentration to 0.8 g/mL (~44% w/w) led to smooth fibers (FIG. 4).

ii. 40 kDa Dextran

Figure 5:
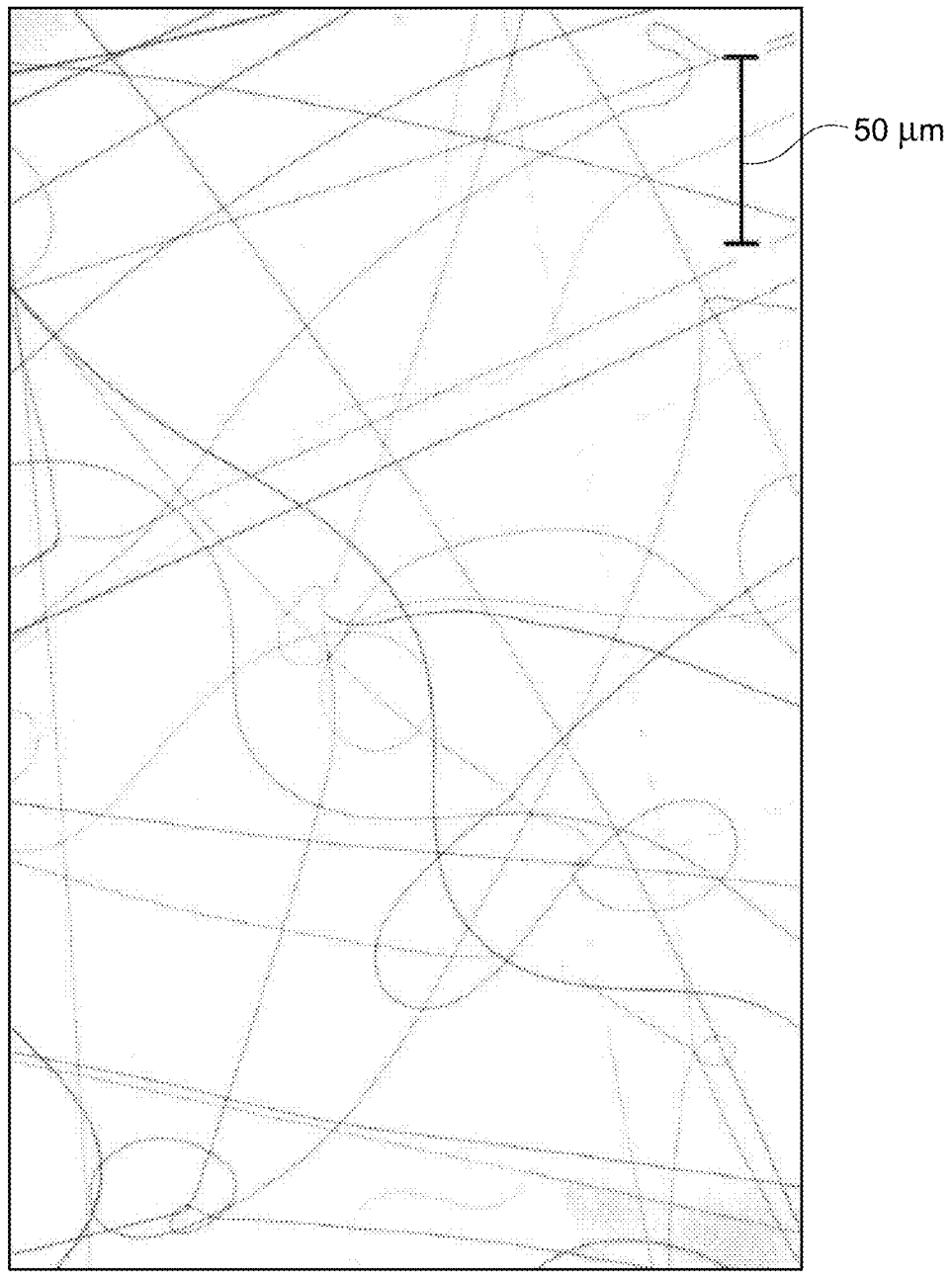
FIG. 5 illustrates an LM image of neat dextran electrospun fibers prepared from an aqueous solution of dextran (40 kDa) at 1.0 g/mL.

For 40 kDa dextran the minimum electrospinnable concentration increased to 1 g/mL solvent (~50% w/w). The fiber morphology was smooth and continuous (FIG. 5). The electrospinning conditions were kept constant at: voltage=20 kV, electrospinning distance=18 cm and solution flow rate=12 µL/min.

iii. 100 kDa Dextran

Figure 6:
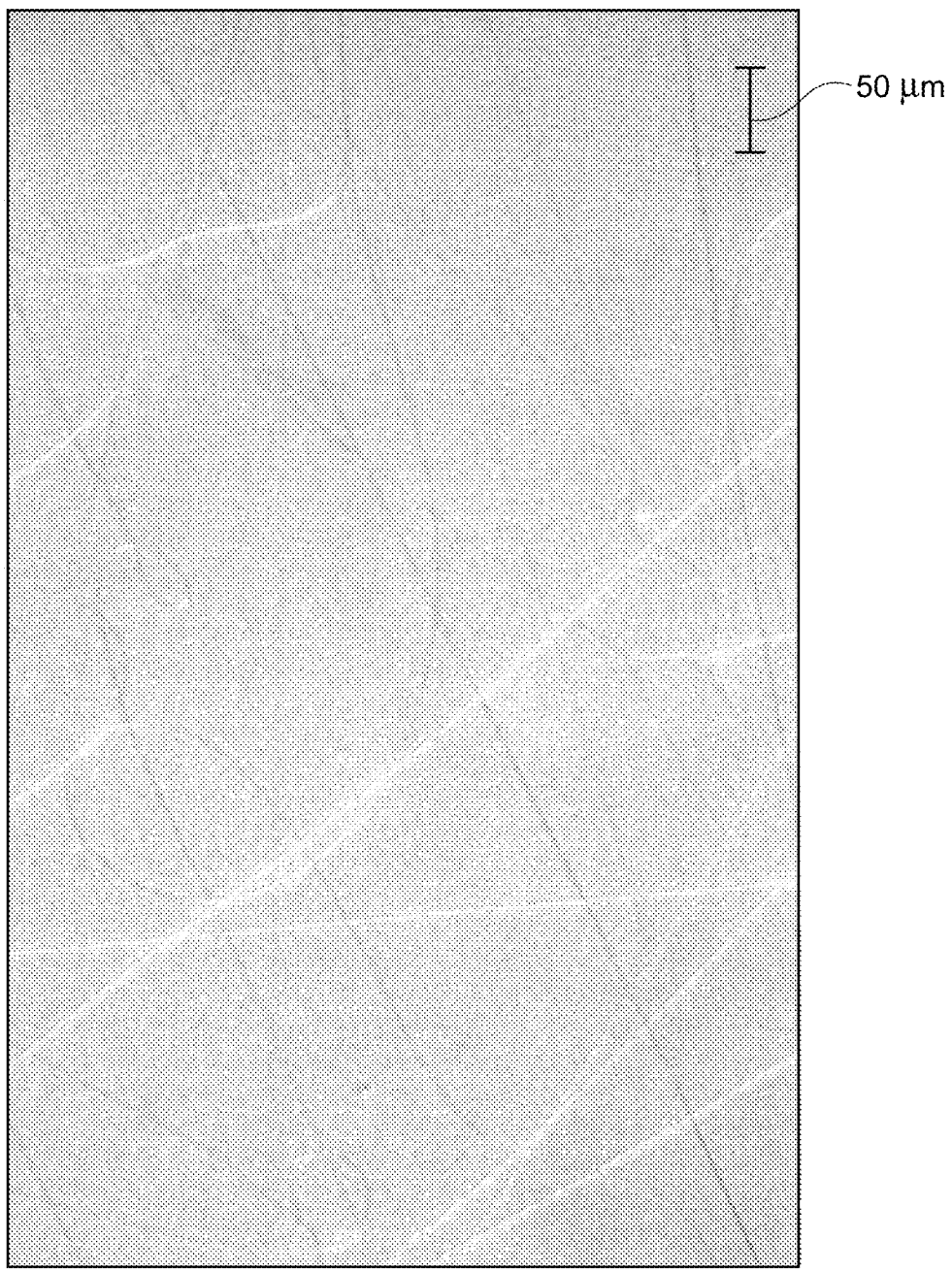
FIG. 6 illustrates an LM image of neat dextran electrospun fibers prepared from the aqueous solution of dextran (100 kDa) at 0.6 g/mL.

For 100 kDa Dextran, the minimum dextran concentration decreased to 0.6 g/mL (~38% w/w) in order to produce smooth fibers under the same electrospinning condition (FIG. 6).

Based on these data the minimum electrospinning concentration of dextran solutions was calculated as in Table 4.

TABLE 4

Minimum Electrospinning Concentration of Dextran Solutions.

| Dextran Molecular Weight (kDa) | Minimum Electrospinning Concentration (g/ml solvent) |
| --- | --- |
| 40 | 1.0 |
| 70 | 0.8 |
| 100 | 0.6 |

Example 3

Viscosity Analysis of WPI-Dextran Mixtures

Generally, a polymer solution can be electrospun only within an appropriate range of viscosities (1-20 poises) [14]. If the viscosity is too high, clogging may take place during electrospinning [15]. Viscosity depends on polymer concentration and polymer molecular weight. Mixtures of dextran-whey protein isolate were prepared and viscosities of the mixtures were examined. The concentration of the mixture depended on dextran molecular weight. The total concentration was the same as the minimum electrospinnable concentration of dextran solution shown in Table 4.

The mixing ratio between dextran and whey protein isolate was kept constant at 3:1 (by weight). The mixture formulations are summarized in Table 5.

TABLE 5

Dextran and whey protein isolate mixture formulation

| No. | Dextran Molecular Weight (kDa) | Total Solid Content (g/mL solvent) | |
| --- | --- | --- | --- |
| | | Dextran | Whey Protein Isolate |
| 1 | 40 | 0.75 | 0.25 |
| 2 | 70 | 0.60 | 0.20 |
| 3 | 100 | 0.45 | 0.15 |

Figure 7:
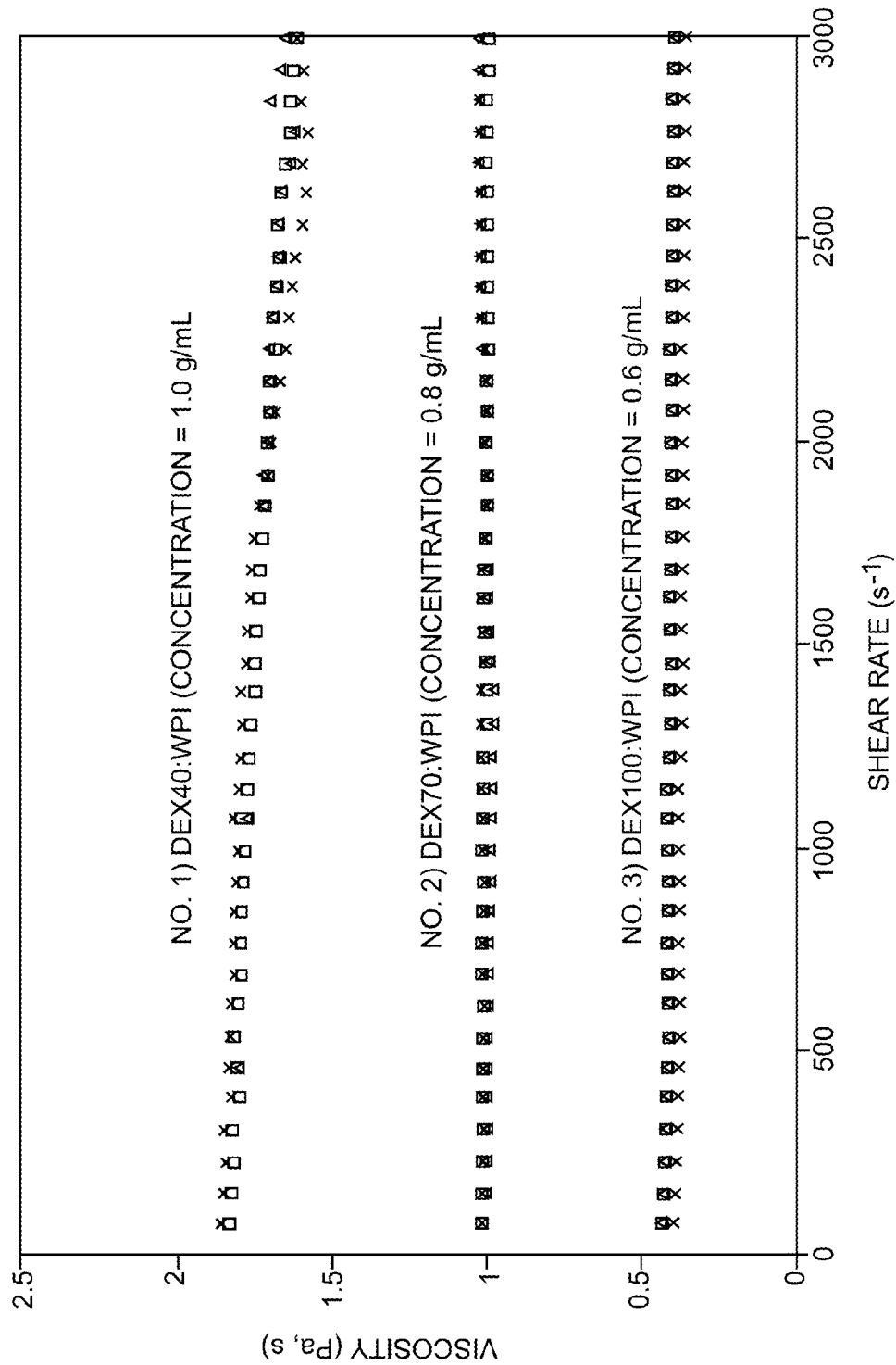
FIG. 7 illustrates the viscosity of dextran-whey protein isolate mixtures prepared with different dextrans at the minimum electrospinnable concentration.

FIG. 7 shows the viscosity of these mixtures. The viscosity of mixture number 1 was approximately 1.8 Poise (Pa·s) and about 2-5 times higher than the viscosity of the mixtures number 2 and 3, respectively.

The high viscosity of the solution prepared from 40 kDa dextran caused two problems. First, the solution was difficult to prepare and to handle since the solution was not only viscous but also very sticky. A thick layer of foam (~60% of total height) formed during dissolution of the mixture, likely due to very high content of whey protein in the solution. After overnight stirring, it was necessary to leave the solution in a vacuum chamber in order to remove the air from the protein-air interface. Second, clogging rapidly took place during electrospinning due to the high viscosity of the solution.

As a result, the productivity was the lowest in case of the mixture prepared from the lowest molecular weight dextran. Accordingly, it was more convenient to prepare and to electrospin the mixture prepared from 100 kDa dextran, which had the lowest viscosity (about 0.4 Pa·s).

Example 4

Morphology Analysis of Electrospun Fibers

Dextran-whey protein isolate electrospun fibers were prepared as described in Table 1 to which was added whey protein isolate into dextran solution at a mixing ratio of 3:1 (dextran-whey protein isolate). FIG. 8 shows selected SEM images of dextran-whey protein isolate electrospun fibers. For all samples, fibers were smooth and no beads were observed. See FIGS. 8A-C. These data showed that the polymer concentration of each solution had been appropriately selected, and that the incorporation of whey protein isolate into dextran solution at a mixing ratio of 3:1 (dextran-whey protein isolate) did not negatively affect the electrospinnability of the mixture.

Figure 8A:
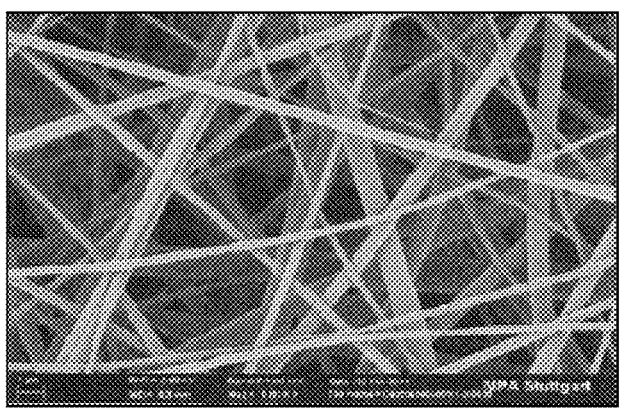
FIGS. 8A-F.
Figure 8B:
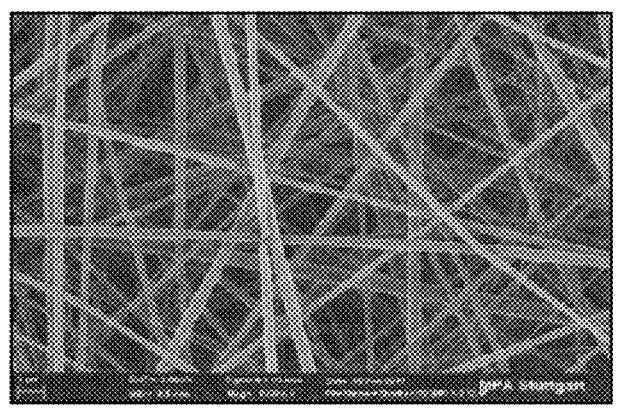
Figure 8C:
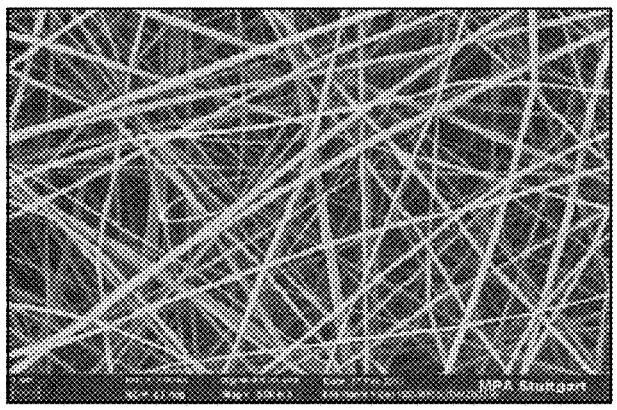
Figure 8D:
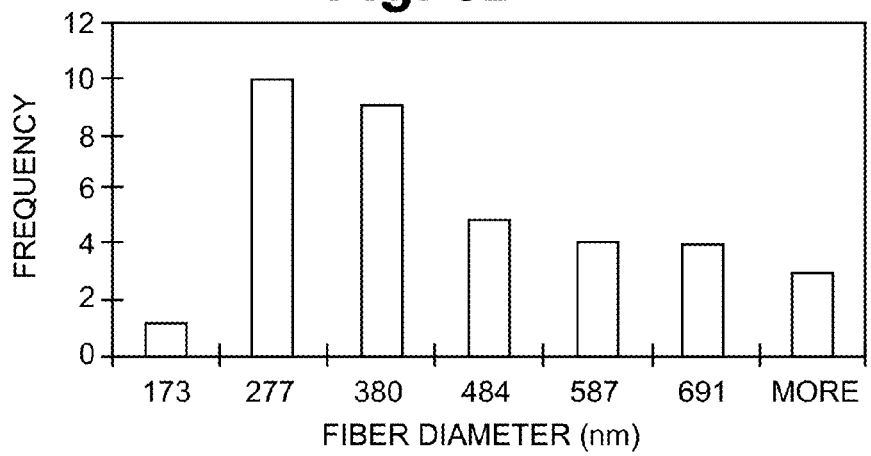
Figure 8E:
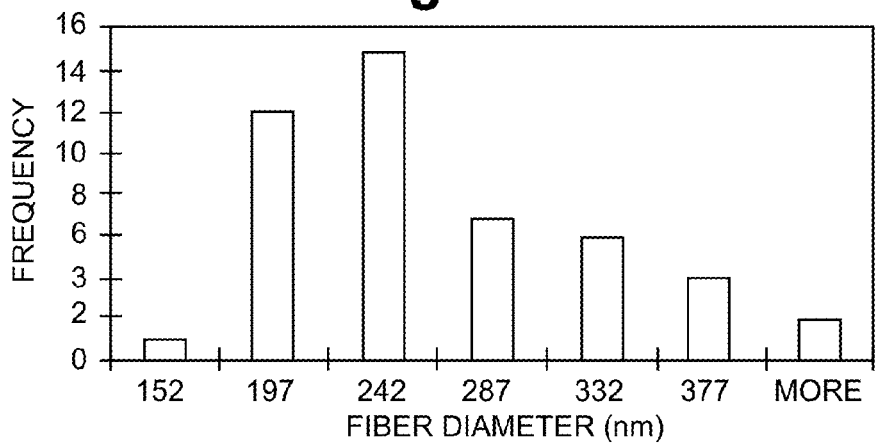
Figure 8F:
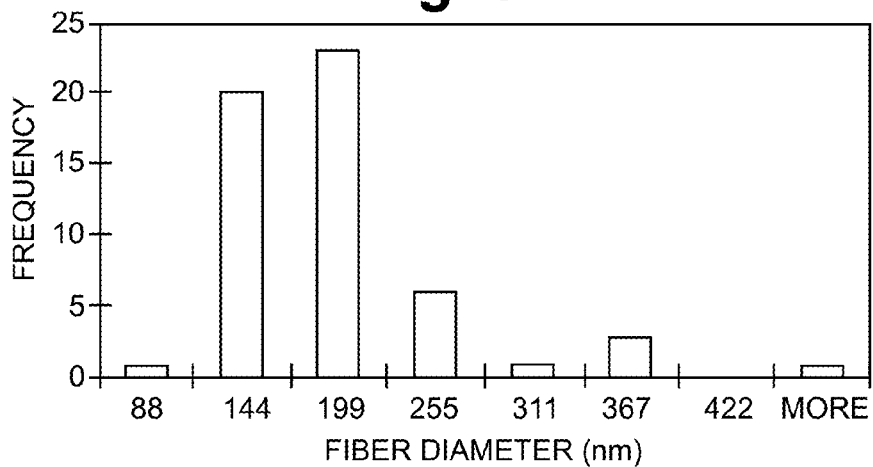

The range of fiber diameters corresponding to FIGS. 8A-C is shown in FIGS. 8A-F. The diameters of the dextran-whey protein isolate fibers prepared from 40, 70 and 100 kDa dextran were 410±180, 247±82, 173±72 nm, respectively. The difference in fiber diameters may be due to the difference in solution viscosities.

The viscosity of the mixture prepared from 40 kDa dextran was highest because of the large minimum electrospinnable concentration. The mixture prepared from 40 kDa dextran displayed rapid clogging was observed and a very large average fiber diameter. This could be due to the high viscosity. In contrast, the mixture of 100 kDa dextran/whey protein isolate mixture was easier to prepare and to handle, had a lower clogging frequency and yielded smaller fiber diameters.

Accordingly, dextrans between 40 kDa and 100 kDa are useful for forming fibers, with dextrans about 100 kDa being preferred.

Example 5

Properties of Mixtures Containing Dextran and WPI

Dextran powder and/or whey protein isolate at various mixing ratios (1:0, 0.8:0.2, 0.75:25, 0.67:0.33 and 0.5:0.5 by weight) were dissolved in 30 mM phosphate buffer solution. The solution was stirred on a magnetic stirrer overnight at room temperature (~22° C.) to ensure a complete dissolution of the mixture. The solution viscosity, conductivity, density and pH were measured using a rheometer (Physica, MCS 300, Ashland, Va.), a microprocessor conductivity meter (WTW, LF537, Weiheim, Germany), a density meter (Anton Paar, DMA 35N, Graz, Austria) and a pH meter (WTW, Inolab, Weiheim, Germany), respectively. Final pH of all solutions was 6.50±0.07.

The effects of dextran concentration and mixing ratio between dextran and whey protein isolate on solution properties and fiber morphologies were investigated.

FIG. 9 shows the flow behavior of aqueous dextran solution. The viscosities of the solutions having concentrations of 0.7, 0.6, 0.45 and 0.3 g/mL solvent were approximately 1.4, 0.7, 0.3 and 0.1 Pa·s, respectively. Table 6 shows the consistency coefficient and the flow behavior indices of all solutions. The first three solutions (0.7, 0.6 and 0.45 g/mL solvent) exhibited shear thinning behavior as confirmed by the flow behavior index, n<1. At the concentration of 0.3 g/mL solvent, the flow behavior of the solution became increasingly Newtonian, which indicated a significant decrease in polymer chain entanglement.

TABLE 6

Consistency coefficient and the flow behavior indices.

| No. | Concentration (g/ml solvent) | k | n |
|---|---|---|---|
| 1 | 0.70 | 2.398 ± 0.314 | 0.92 ± 0.02 |
| 2 | 0.60 | 0.844 ± 0.039 | 0.97 ± 0.01 |
| 3 | 0.45 | 0.305 ± 0.087 | 0.98 ± 0.03 |
| 4 | 0.30 | 0.075 ± 0.002 | 1.01 ± 0.01 | k and n values are Averages +/− Standard Deviation of duplicate measurements.

Figure 10:
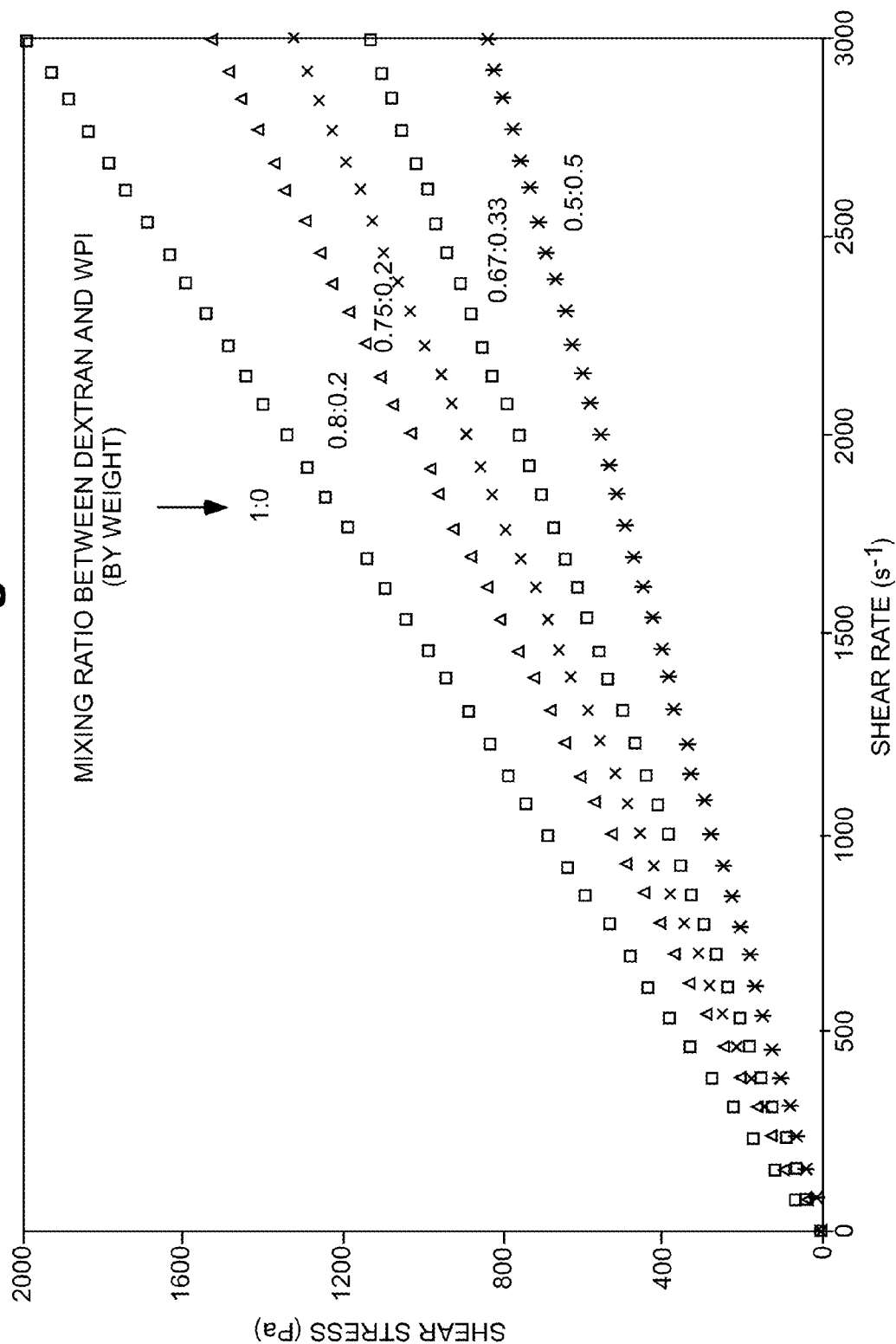
FIG. 10 illustrates the effect of the mixing ratio on the flow behavior of dextran and whey protein mixtures. The total solid content was 0.6 g/mL for each mixture.

When WPI was added into the dextran solution, mixture viscosity decreased significantly. FIG. 10 shows the effect of WPI content on the viscosity of the dextran-whey protein isolate mixture, compares with pure dextran solution. Higher WPI content correlated with lower mixture viscosity. This might be because the globular structure of whey protein isolate decreased the degree of chain entanglement of dextran in the mixture; and resulted in a decrease in mixture viscosity. The flow behavior indices of the mixtures decreased with an increase in protein content (Table 7. At the mixing ratio of 0.5:0.5, the mixture seemed to have Newtonian flow behavior, similar to the dextran solution that had the lowest concentration of 0.3 g/mL solvent.

TABLE 7

Consistency coefficient (k) and flow behavior index (n) of dextran solution and dextran (100 kDa)-whey protein isolate mixture

| No. | Total solid (g/mL solvent) | Mixing ratio (dextran:WPI) | k | n |
|---|---|---|---|---|
| 1 | 0.60 | 1:0 | 0.84 ± 0.04 | 0.97 ± 0.01 |
| 2 | 0.60 | 0.80:0.20 | 0.65 ± 0.06 | 0.97 ± 0.01 |
| 3 | 0.60 | 0.75:0.25 | 0.52 ± 0.06 | 0.98 ± 0.02 |
| 4 | 0.60 | 0.67:0.33 | 0.41 ± 0.03 | 0.99 ± 0.01 |
| 5 | 0.60 | 0.50:0.50 | 0.24 ± 0.02 | 1.02 ± 0.01 | k and n values are Averages +/− Standard Deviation of duplicate measurements.

In contrast to the viscosity, the mixture's electrical conductivity increased with higher protein content (Table 8). The WPI has a net negative charge because mixture pH was about 6.5 and the isoelectric point (pI) of whey protein is ~5.2. The polar structure of whey protein isolate thus increased the total mobility of ions in the mixture, resulting in the higher electrical conductivity.

TABLE 8

Effect of whey protein isolate content on mixture's electrical conductivity

| | Mixing ratio | | Electrical* |
|---|---|---|---|
| No. | 100 kDa Dextran | WPI | Conductivity (mS/cm) |
| 1 | 1 | 0 | 0.64 ± 0.06 |
| 2 | 0.80 | 0.20 | 0.92 ± 0.00 |
| 3 | 0.75 | 0.25 | 1.09 ± 0.03 |
| 4 | 0.67 | 0.33 | 1.26 ± 0.02 |
| 5 | 0.50 | 0.50 | 1.51 ± 0.03 |

*The values reported are the average value ± standard deviation of duplicate measurement.

Example 6

Figure 11A:
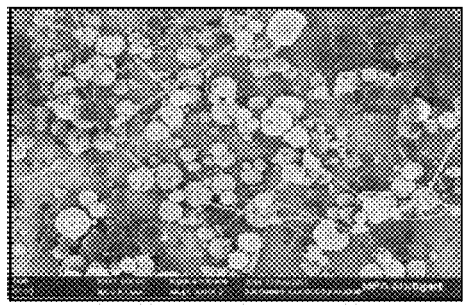
FIGS. 11A-H.
Figure 11B:
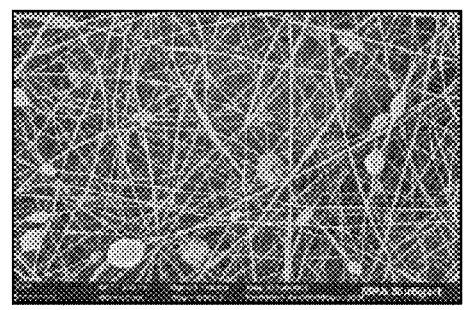
Figure 11C:
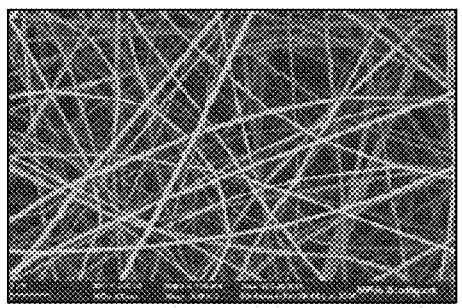
Figure 11D:
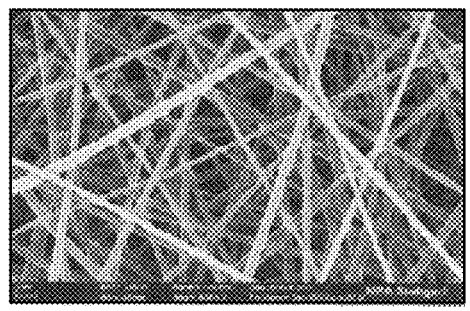
Figure 11E:
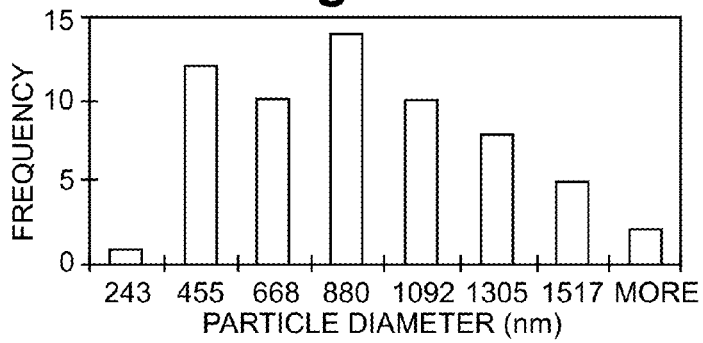
Figure 11F:
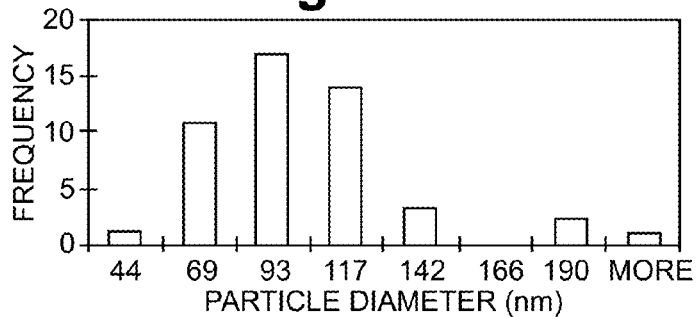
Figure 11G:
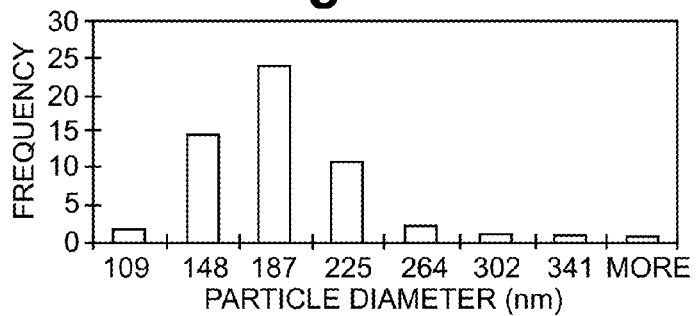
Figure 11H:
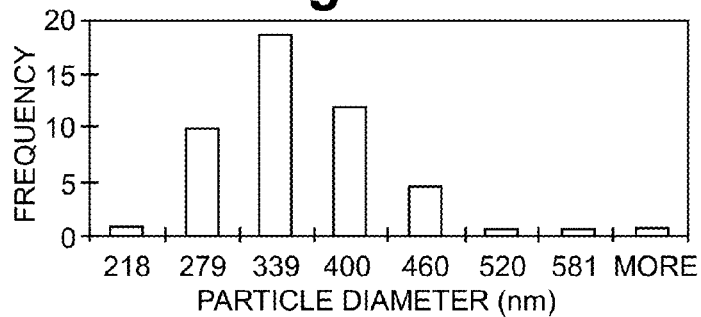

Morphology of Fibers Electrospun from Dextran and Dextran/WPI Mixtures a. Dextran Only Fibers Fibers were prepared using 100 kDa dextran at different concentrations. FIG. 11 shows the effects of 100 kDa dextran concentration on the morphologies of dextran fibers. At the lowest concentration (0.3 g/mL solvent), mainly beads with an average diameter of 800 nm and few short fibers were formed (FIG. 11A). This indicated there was insufficient polymer chain entanglement as shown by the Newtonian flow behavior, as indicated by the shear stress-strain behavior or the flow behavior index of the solution as summarized in Table 8. Increasing the polymer concentration to 0.45 g/mL solvent noticeably decreased bead formation (FIG. 11B). The morphology became more fiber-like with an average diameter of about 90 nm. Occasionally, short fibers were observed, indicating that polymer chain entanglement was still too low to produce continuous fibers. Smooth and continuous fibers were formed when the dextran concentration was 0.6 g/mL solvent (FIG. 11C). The average fiber's diameter was found to be about 180 nm. Further increase in dextran concentration to 0.7 g/mL solvent resulted in a large increase in the average fiber's diameter to about 300 nm. (See FIGS. 11E-H). These data establish that, for 100 kDa dextran, a concentration of 0.6 g/mL solvent is optimum.

a. Dextran-WPI Fibers

Figure 12A:
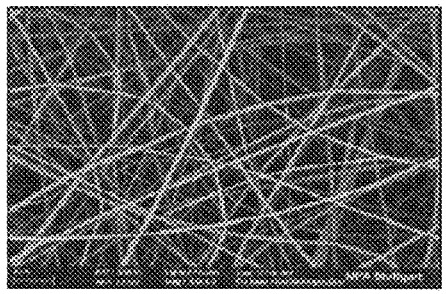
FIGS. 12A-J.
Figure 12B:
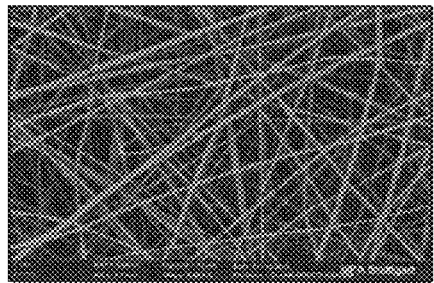
Figure 12C:
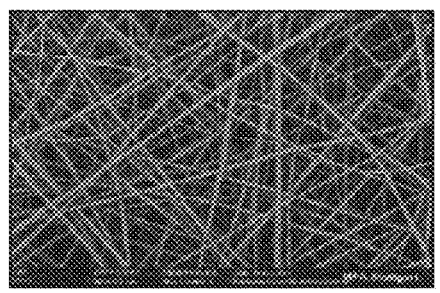
Figure 12D:
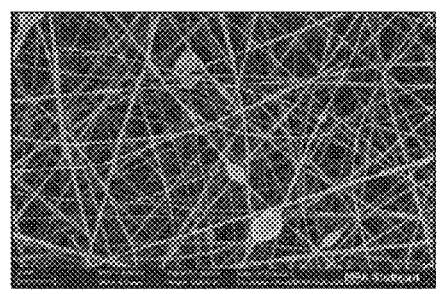
Figure 12E:
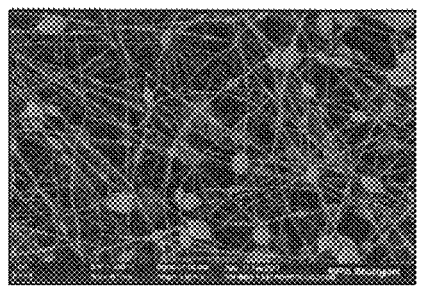
Figure 12F:
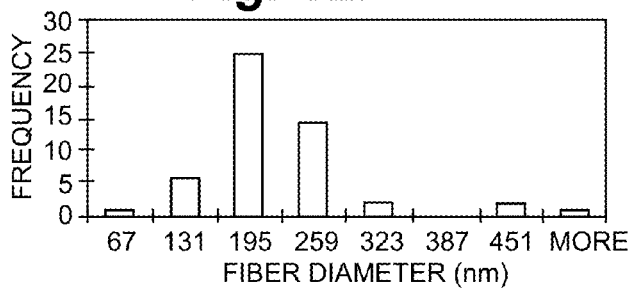
Figure 12G:
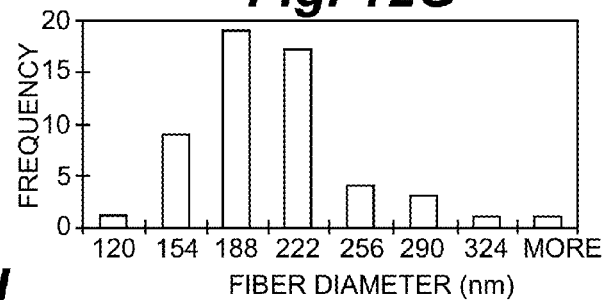
Figure 12H:
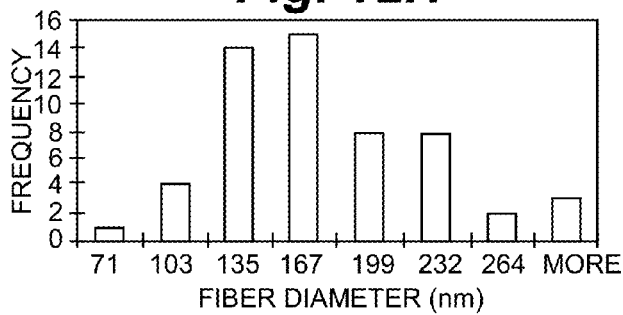
Figure 12I:
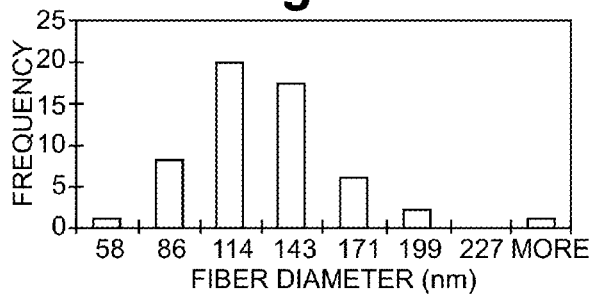
Figure 12J:
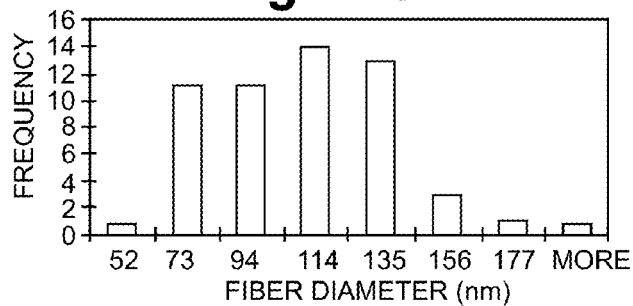

Whey protein isolate was mixed into 0.6 g/mL dextran solution at different mixing ratios (see Table 8). FIG. 12 shows the effect of whey protein isolate content on the morphologies of electrospun fibers. The average fiber diameter slightly decreased from 192 nm (FIGS. 12A and F) to 186 nm (FIGS. 12B and G) when the mixing ratio between dextran and whey protein content changed from 1:0 to 0.8:0.2. Further increasing whey protein content by changing the mixing ratio to 0.75:0.25 decreased the average fiber diameter to about 161 nm (FIGS. 12C and H).

The decreased fiber diameter is due to an increase in the electrical conductivity and a decrease in the viscosity of the mixture when the whey protein isolate content was higher, which favors stretching of the polymer jets during electrospinning, resulting in thinner fibers.

However, when the whey protein content was equal to or higher than 33%, beads on fibers were observed (See FIGS. 12D and 12I, and 12E and 12J), indicating that the viscosity of the mixtures was too low. Accordingly, a whey protein content of less than 33% is optimal.

Example 7

Analysis of Fiber Protein Content by Fourier Transform Infrared Spectrometer (FTIR)

Figure 13A:
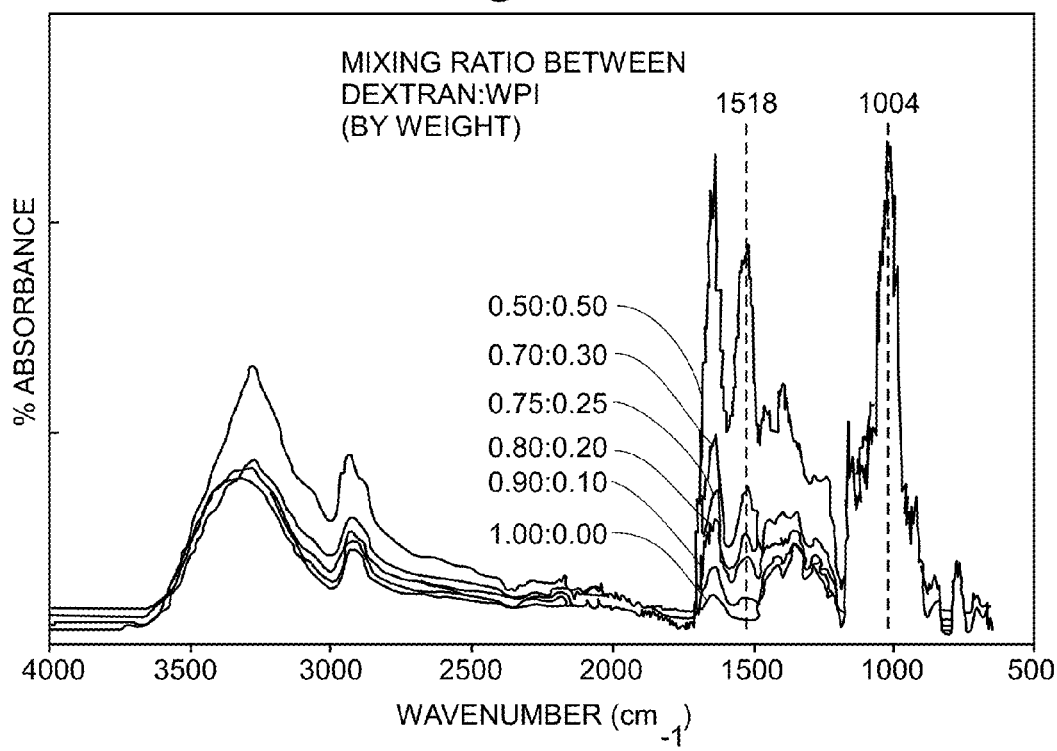
FIG. 13A shows IR spectra of the mixture between dextran powder and whey protein isolate powder at different mixing ratio.
Figure 13B:
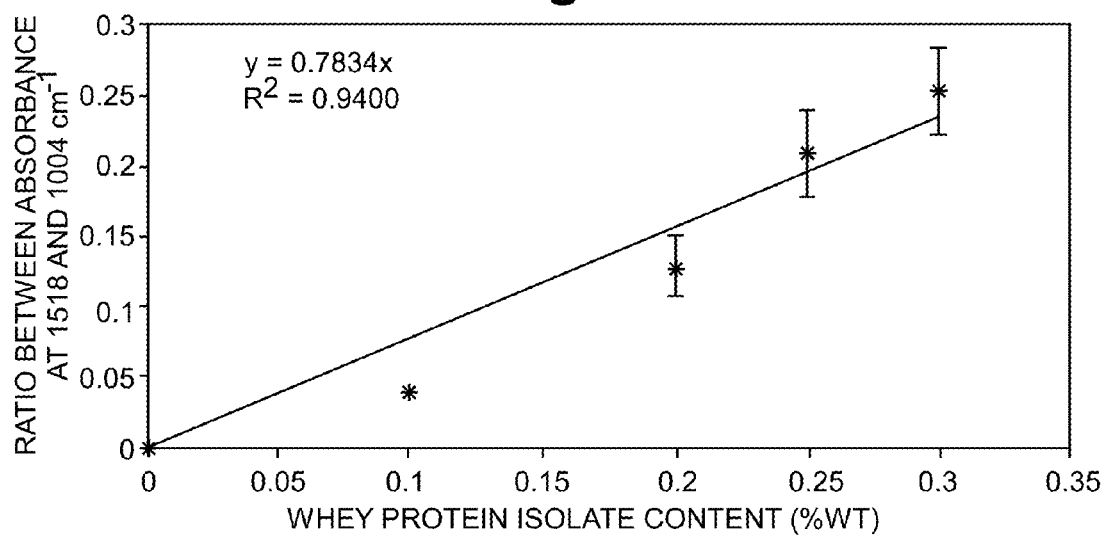
FIG. 13B shows the relationship between whey protein isolate content and the ratio between peak absorbance at wavenumber of 1518 and 1004 $cm^{-1}$.

FTIR was performed as described in Example 1. IR spectra of the mixtures having different amount of dextran (powder) and whey protein isolate (powder) were collected (FIG. 13A). The peak absorbance in the amide band II region at around 1520 cm$^{-1}$ increased remarkably with protein content and was used as an indicator of the protein content in the sample. The ratio between the peak absorbance at the wavenumber of around 1520 cm$^{-1}$ and 1000 cm$^{-1}$ was calculated from each spectrum and the data was re-plotted in FIG. 13B. Interestingly, a linear relationship between the protein content ($\omega$) and the ratio between two peak absorbance ($p_r$) was found as ($R^2$=94.00%): $p_r$=7834.0=$\omega$. (Equation 2.2).

The relationship remained linear up to protein concentrations of 30% wt. When the whey protein content reached 50% a non-linear relationship was observed. However, since the target value of protein content used in this study was about 25% wt, equation 2.2 was still valid for the quantitative analysis.

Table 9 shows the values of protein content in electrospun films prepared from mixtures of dextran-whey protein isolate at different mixing ratio. The calculated value was not much different from the mixing ratio, indicating that polysaccharide and protein were simultaneously electrospun This indicated that both protein and polysaccharide were simultaneously present in the electrospun fibers at concentrations desirable for subsequent conjugate reaction formation.

TABLE 9

Analysis of whey protein isolate content in electrospun films prepared from dextran-whey protein isolate at different mixing ratio

| | Mixing ratio | | Whey Protein Isolate* |
|---|---|---|---|
| No. | 100 kDa Dextran | WPI | (% wt) |
| 1 | 1 | 0 | 0.20 ± 0.01 |
| 2 | 0.80 | 0.20 | 0.22 ± 0.01 |
| 3 | 0.75 | 0.25 | 0.32 ± 0.03 |

*The values reported are the average value ± standard deviation of duplicate measurement.

Example 8

Analysis of WPI-Dextran Conjugate Formation

Although the WPI protein was associated with the dextran fibers, we needed to confirm that conjugation; i.e. formation of covalent bonds, was occurring. Accordingly, we investigated the conditions where conjugates between WPI and dextran are formed, including dextran molecular weight, humidity during annealing and mixing ratio between WPI and dextran on WPI-dextran conjugates formation were studied.

Gel electrophoresis was employed to verify the presence of glycoproteins in annealed electrospun films and a UV-VIS-NIR spectrophotometer was used to examine color development during annealing and to obtain NIR spectra of electrospun films.

Example 9

Appearance of Heat Treated Films

Figure 14:
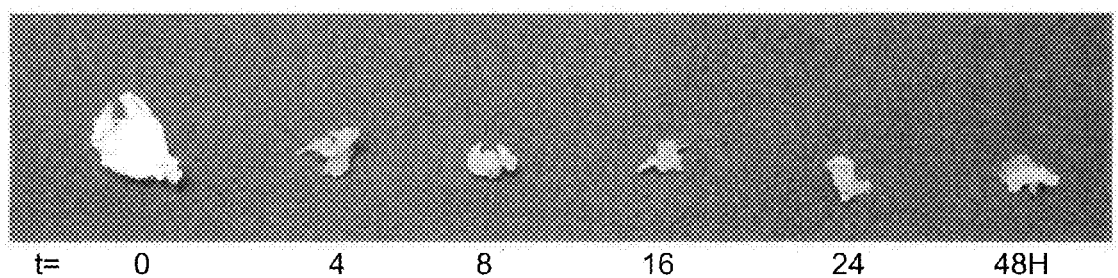
FIG. 14 shows the appearance of electrospun films annealed at 60° C. and 74% RH for different times.

FIG. 14 shows the appearance of as-spun and annealed electrospun films. The color of as-spun film was white with lower densities while annealed samples increased in density and were slightly more yellowish (FIG. 14). There was no smell detected after annealing, indicating that no short molecular weight Maillard reaction products were formed. The color of the films became more yellow with increasing annealing times.

Example 10

Analysis of Conjugate Formation

Initial approaches to detecting glycosylated proteins by measuring the IR spectra were unsuccessful. We expected a significant change in the absorbance of WPI-dextran IR spectra at around 1630-1640 cm$^{-1}$ due to N=C stretching (Schiff-base product formation during Maillard reaction) [16, 17]. However, IR spectra obtained from mixture of WPI-dextran powder and electrospun films that were annealed at 60° C. and 74% RH were not that much different. See FIG. 15. This might be because the technique was not sensitive enough to detect the presence of WPI-dextran conjugates in annealed electrospun films compared to the presence of unreacted dextran and WPI.

Therefore conjugation was assessed using gel electrophoresis, as described in Example 1, which is more effective in detecting glycoprotein formation in the samples.

Figure 16:
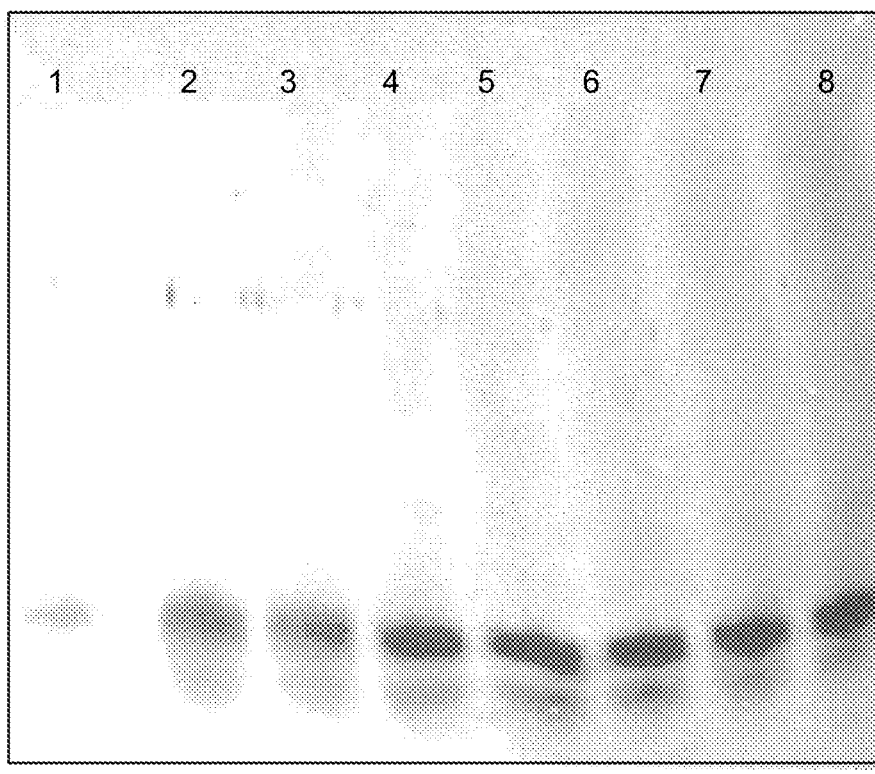
FIG. 16 illustrates the effect of annealing time on SDS-PAGE profiles of WPI-Dextran conjugates in a presence of 2-mercaptoethanol. Lane 1: WPI solution; lanes 2-8: electrospun WPI-dextran (40 kDa) film annealed at 60° C. 74% RH for 0, 2, 4, 6, 8, 16, 24 and 48 h, respectively.

We selected 40 kDa dextran because it was reported that smaller molecular weight dextrans may facilitate formation of WPI-dextran conjugates better than higher molecular weight ones [1], allowing us to validate the method before using the target dextran (100 kDa). FIG. 16 shows the SDS-PAGE pattern of WPI-dextran-40 kDa conjugates that were annealed at 60° C. for up to 48 hours. Unexpectedly, it seemed that WPI-dextran 40 kDa conjugates formed in the sample that had been annealed as little as 2 hours (Lane 3).

Figure 17A:
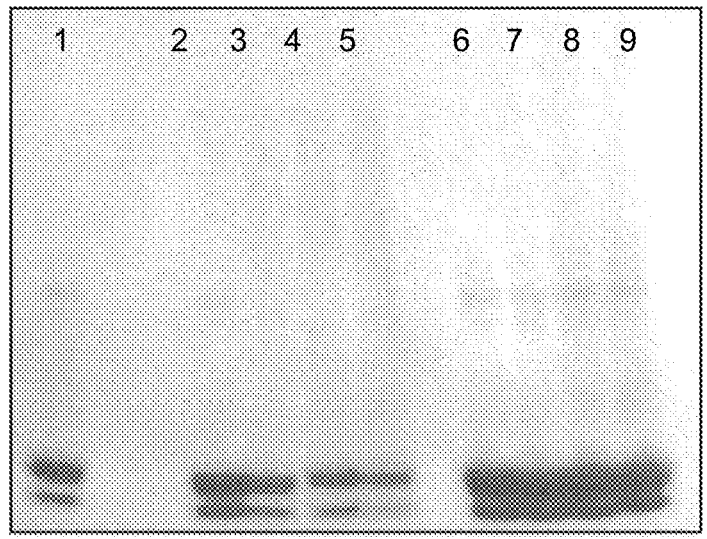
FIGS. 17A and 17B illustrate SDS-PAGE profiles of WPI-Dextran conjugates in a presence of 2-mercaptoethanol.
Figure 17B:
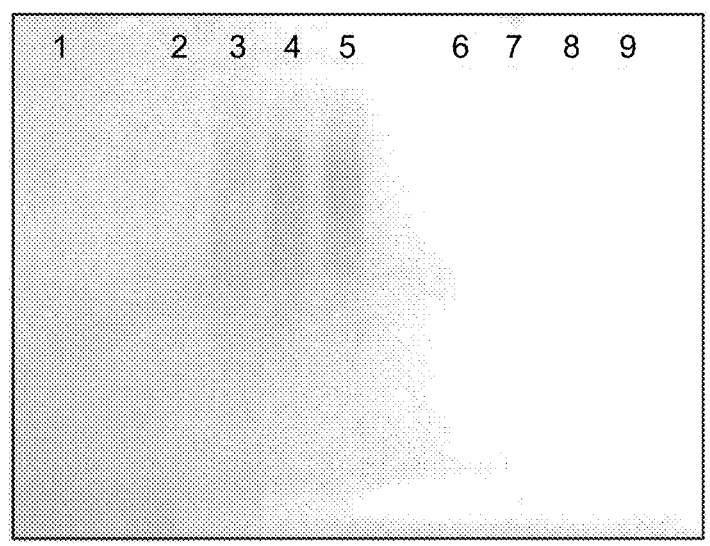

After glycosylation had been confirmed for fibers of dextran-40 kDa and WPI, films were electrospun from a blend of WPI and dextran-100 kDa. Films were annealed and sample solutions were prepared using the same conditions as in the WPI-dextran-40 kDa samples. The prepared samples were then subjected to a gel electrophoresis experiment. In the same gel, samples prepared from the previously annealed WPI-dextran-40 kDa electrospun films were also loaded in order to compare them to solutions prepared from annealed WPI-dextran-100 kDa. SDS-PAGE patterns of WPI-dextran conjugates are shown in FIG. 17. FIGS. 17A and 17B show images of protein-stained and glycoprotein-stained gels, respectively. Both gels were run at the same time.

For samples prepared from dextran-40 kDa, the results were similar to those shown in FIG. 16. Bands of WPI were significantly diminished after the film had been annealed for 8 hours (lane 3). With longer annealing time (lane 4 and 5: 16 and 24 hours, respectively), the band with larger molecular mass compounds became more intense. This indicated that glycosylation of protein and dextran increased with longer annealing times (FIG. 17B).

SDS-PAGE patterns of electrospun film prepared from dextran-100 kDa (lanes 6-9) indicated a similar behavior as those prepared from dextran-40 kDa (lanes 2-5), but with less intensity and a higher location on the gel. We suspect the larger size of dextran-100 kDa reduced the mobility of molecules or decreased the number of contact points between the molecules (both factors that facilitate the reaction). Thus the reaction apparently was a less efficient than that with the smaller dextran-40 kDa. Nevertheless, from FIG. 17B, it is apparent that conjugates are formed and that their size was much larger than that of WPI-dextran-40 kDa conjugates.

Figure 18A:
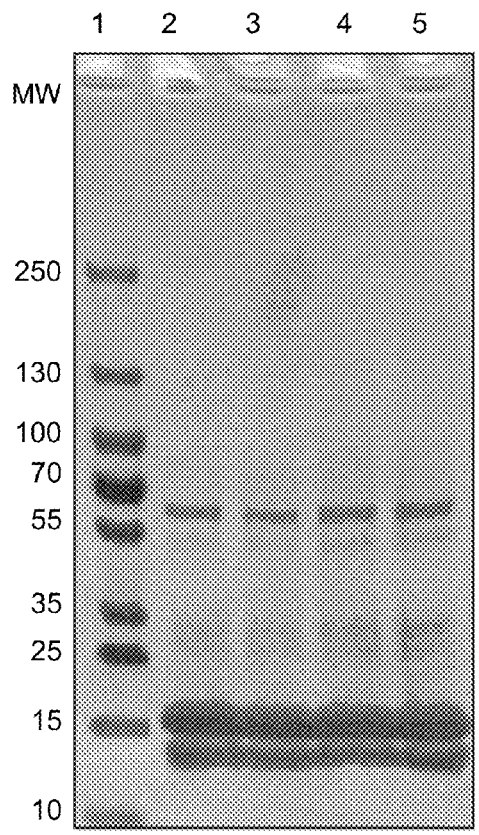
FIGS. 18A and 18B illustrate SDS-PAGE profiles of WPI-Dextran (70 kDa) conjugates.
Figure 18B:
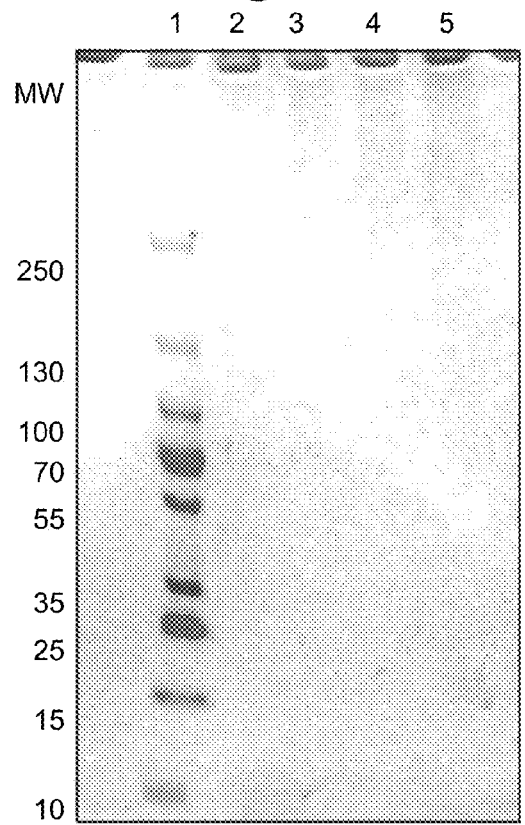
Figure 19:
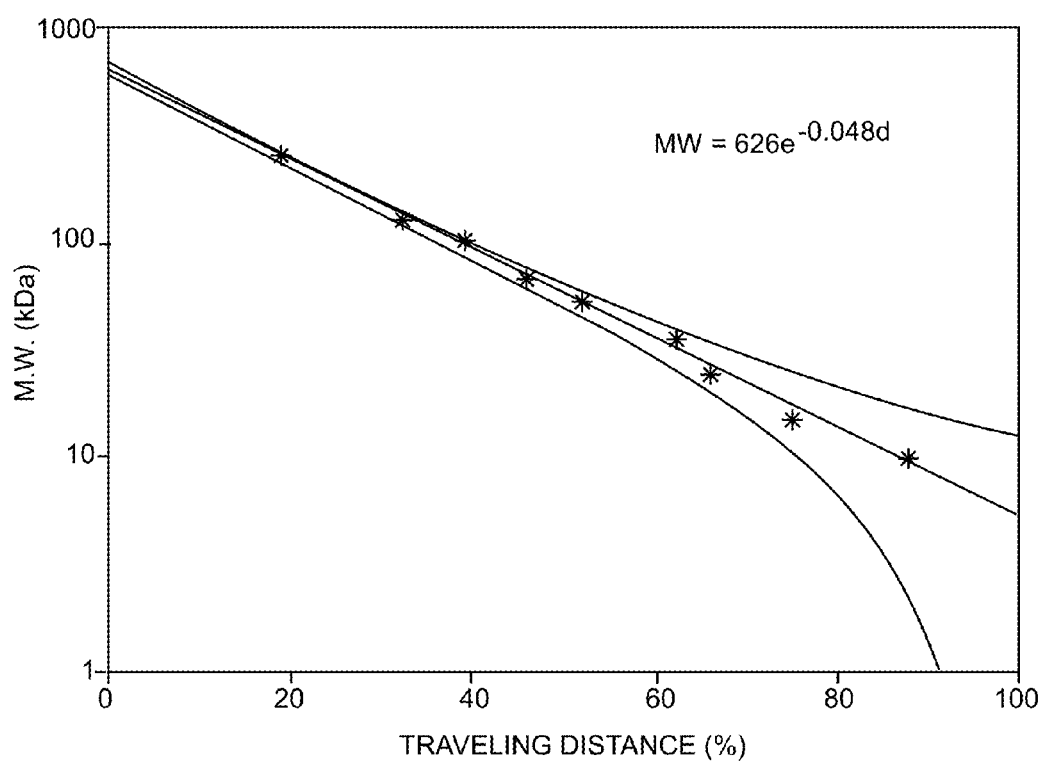
FIG. 19 illustrates the Standard curve of TGX pre-cast gel used for the SDS PAGE gels. Variables MW and d shown in the equation are molecular weight in kDa and traveling distance in %, respectively ($R^2=99.86\%$). The center line and two outer lines show the predicted values and 95% confidence-band, respectively.

FIGS. 18A and B shows SDS-PAGE profiles of WPI-Dextran (70 kDa) conjugates. As before, the glycoprotein band became more intense with longer annealing time. The band intensity was less than those prepared from dextran-40 kDa but more than those prepared from dextran-100 kDa. Standard protein ladder was also loaded into the same gel in order to make a molecular weight standard curve for mini-gel by plotting the traveling distance against known protein molecular weights (FIG. 3.6). The glycoproteins found in electrospun films prepared from dextran 40 kDa, 70 kDa and 100 kDa thus could be estimated as >70 kDa, >200 kDa and >280 kDa, respectively.

Figure 20A:
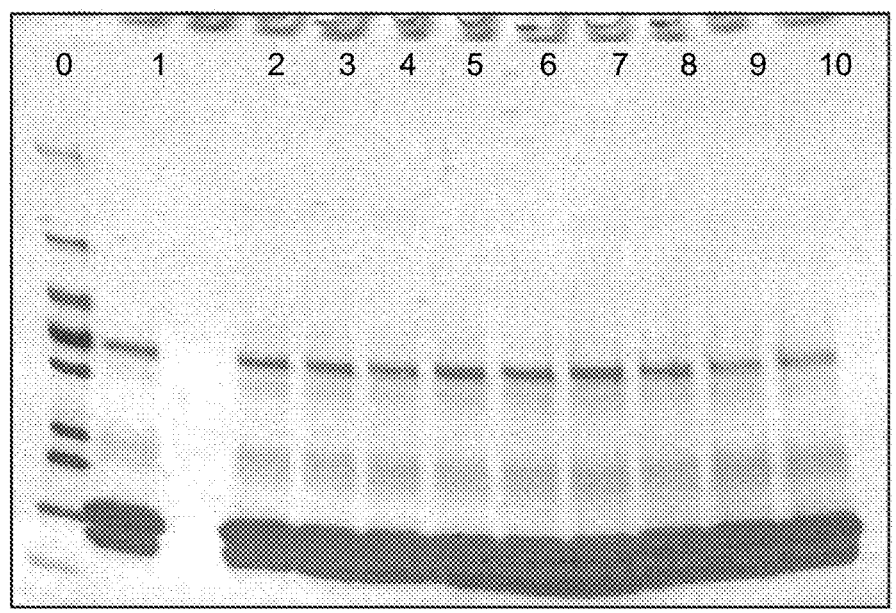
FIGS. 20A and 20B illustrate SDS-PAGE profiles of WPI-Dextran (100 kDa) conjugates formed under different humidity and annealing times. Weight ratio between dextran and WPI in all electrospun films was 3:1.
Figure 20B:
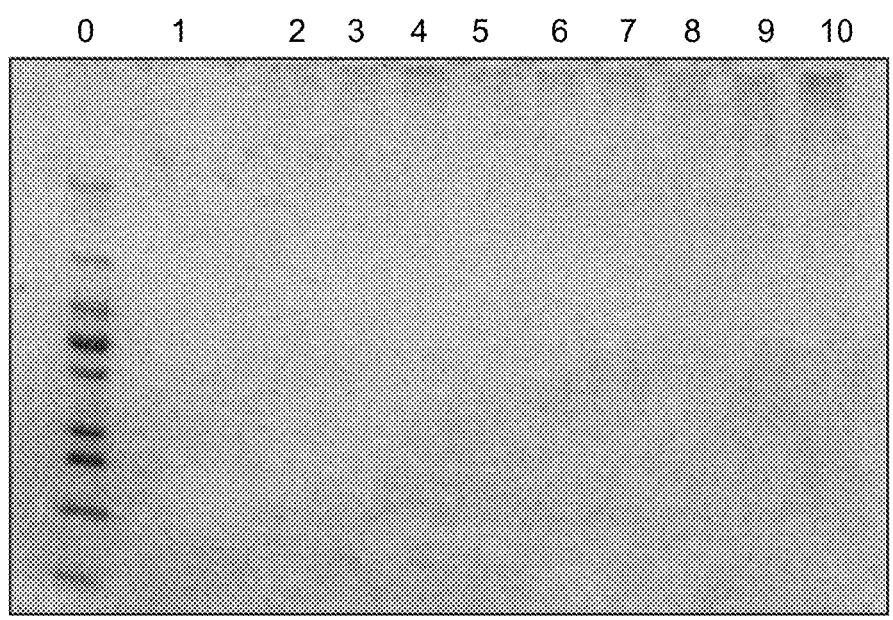

FIGS. 20A and B show the effect of humidity on glycosylation. There was much less intensity of glycosylation bands in glycoprotein-stained gel when samples were annealed under low humidity (0% RH and 44% RH). Enhanced glycosylation was obtained at 74% RH (See Lanes 8-10).

Polymer molecules in electrospun fibers are well-entangled thus the mobility of molecules is limited. Increasing humidity may increase chain flexibility, resulting in more reactions and thus enhanced formation of WPI-dextran conjugates.

The two main components in whey protein isolate used in this experiment, β-lactoglobulin and α-lactalbumin have a molecular weight around 18 and 14 kDa, respectively. This is in agreement with the four bands found at around 14, 18, 30 and 36 kDa which could be attributed to monomers and dimers of two main components in WPI (FIG. 18A). The band at around 60 kDa was assigned to bovine serum albumin (BSA) [7, 19].

Figure 21A:
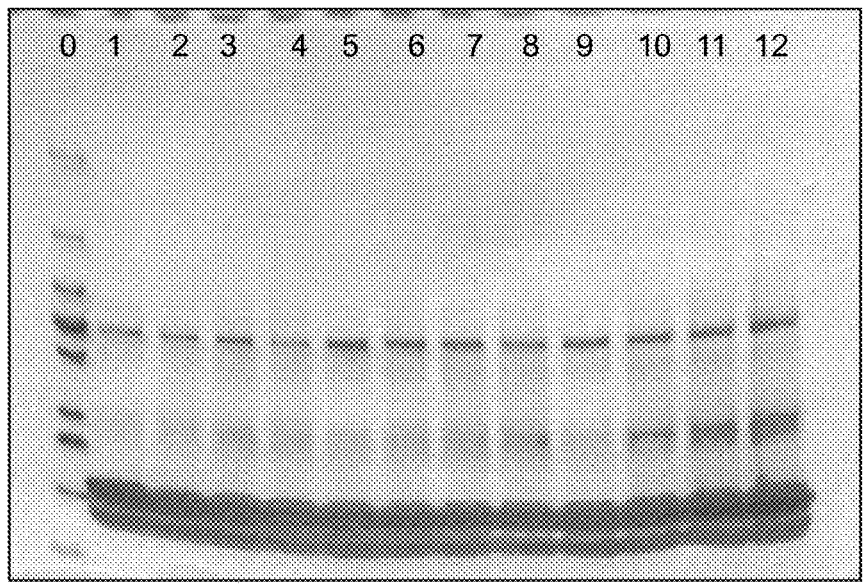
FIGS. 21A and 21B illustrate SDS-PAGE profiles of WPI-Dextran (100 kDa) conjugates under constant humidity conditions. Electrospun films were prepared at different mixing ratios between dextran and WPI: lanes 1-4=1:2; lanes 5-8: 1:1; lanes 9-12: 2:1, respectively.
Figure 21B:
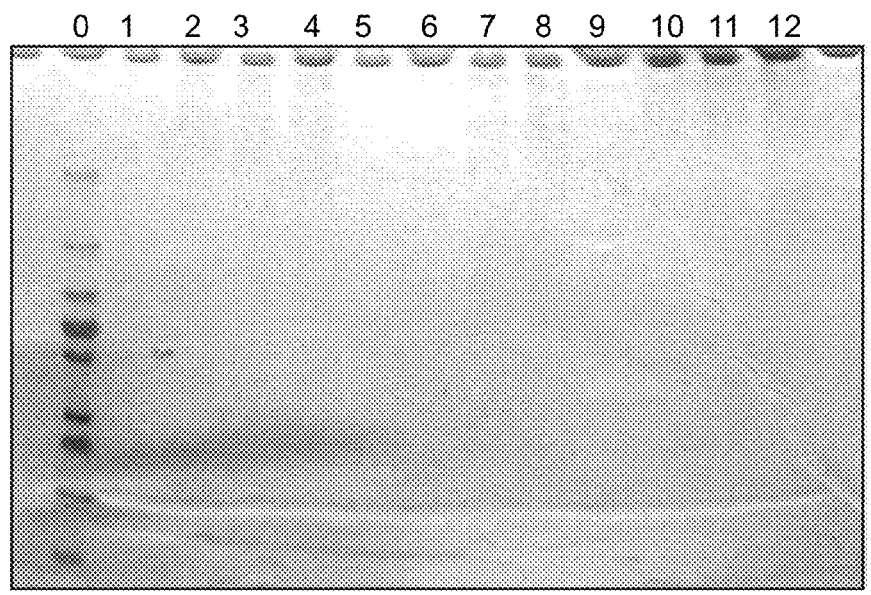

The presence of these major bands in all protein-stained gel meant that there unreacted WPI remained in electrospun film even after annealing for 24 h. This implied that mixing ratio between dextran and WPI could be adjusted by increasing dextran or decreasing WPI in precursor solutions. Thus electrospun films were prepared from WPI and dextran 100 kDa at different mixing ratios. FIG. 21 shows the SDS-PAGE pattern of those electrospun films. The glycoprotein-stained gel confirmed the presences of glycoprotein bands in all annealed electrospun films (lanes 2-4, 6-8, 10-12) but not in as-spun films (lane 1, 5 and 9). The intensity of glycoproteins bands was in following manner: lanes 10-12>lanes 6-8> lanes 2-4. However, there was not that much difference in the intensity of small molecules bands (β-lactoglobulin, α-lactalbumin and BSA). Thus it might be possible that the optimum mixing ratio between dextran-100 kDa and WPI could be higher than 2:1 used in this feasibility study.

Example 11

Color Development During Annealing

Figure 22A:
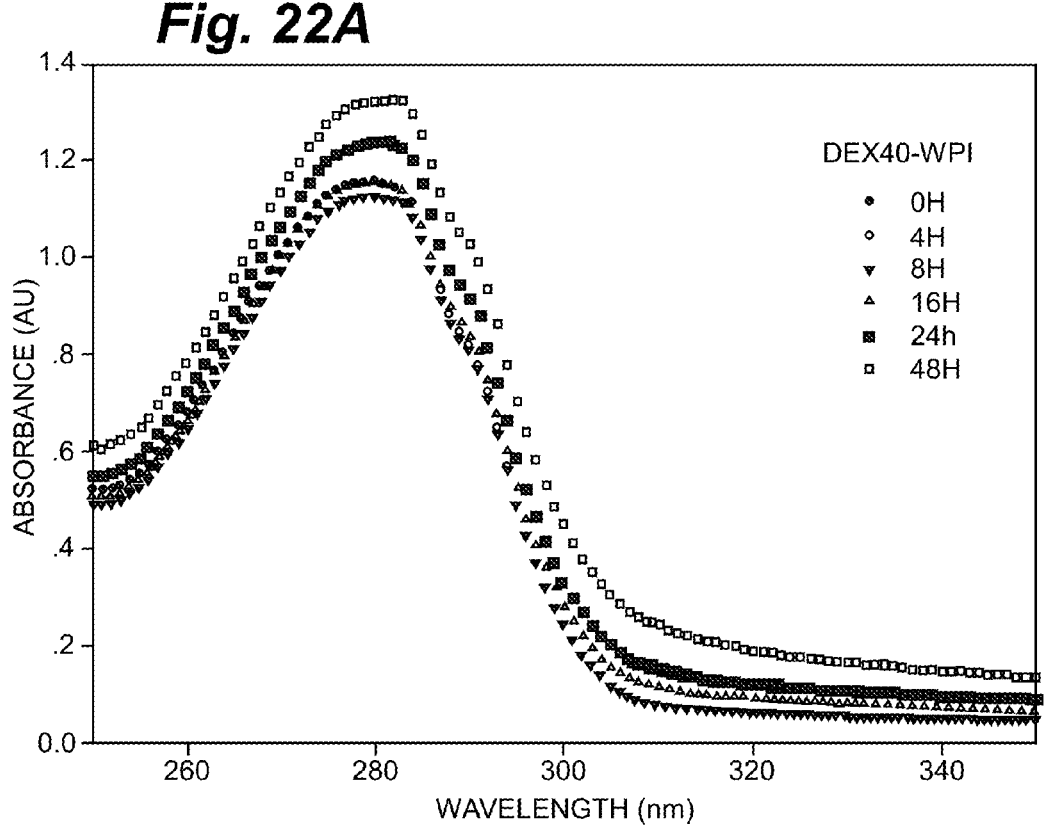
FIG. 22A shows UV absorbance spectra of electrospun samples prepared from mixtures of WPI and dextran 40 kDa annealed at 60° C. and 74% RH with different annealing times.
Figure 22B:
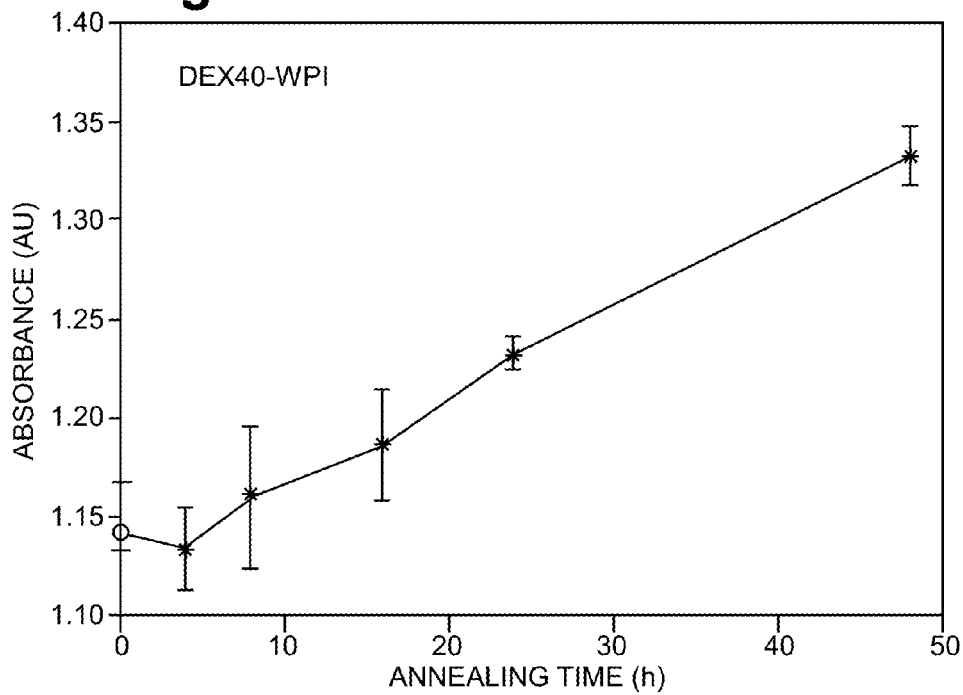
FIG. 22B shows the relationship between absorbance peak at 282 nm of electrospun samples and annealing time (WPI and dextran 40 kDa samples).

To follow the color development of annealed electrospun films as a function of time, absorbance spectra were measured using a UV-VIS-NIR spectrophotometer. FIGS. 22A and 22B show the UV absorbance spectra of electrospun films prepared from dextran-40 kDa annealed at different times. The spectra show only one clear absorbance peak at around 280 nm which was the same wavelength that used to detected protein residual in samples [20, 21]. The result shows that absorbance peaks increased with annealing time.

Figure 23A:
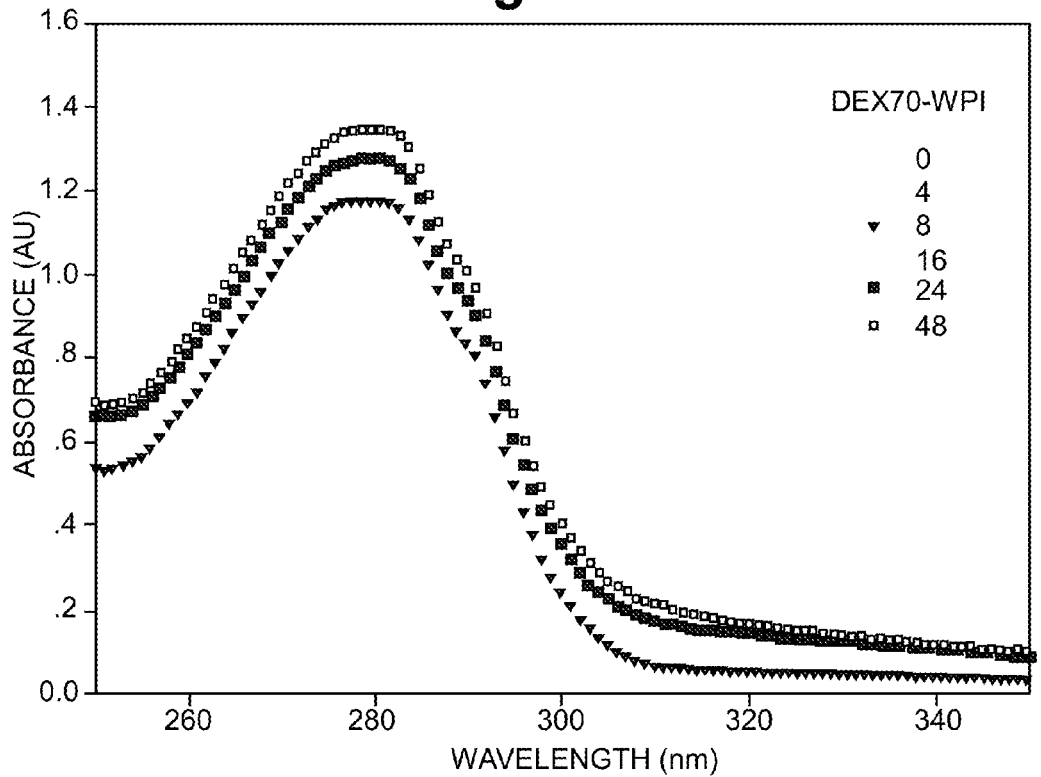
FIG. 23A shows UV absorbance spectra of electrospun samples prepared from mixtures of WPI and dextran 70 kDa annealed at 60° C. and 74% RH with different annealing times.
Figure 23B:
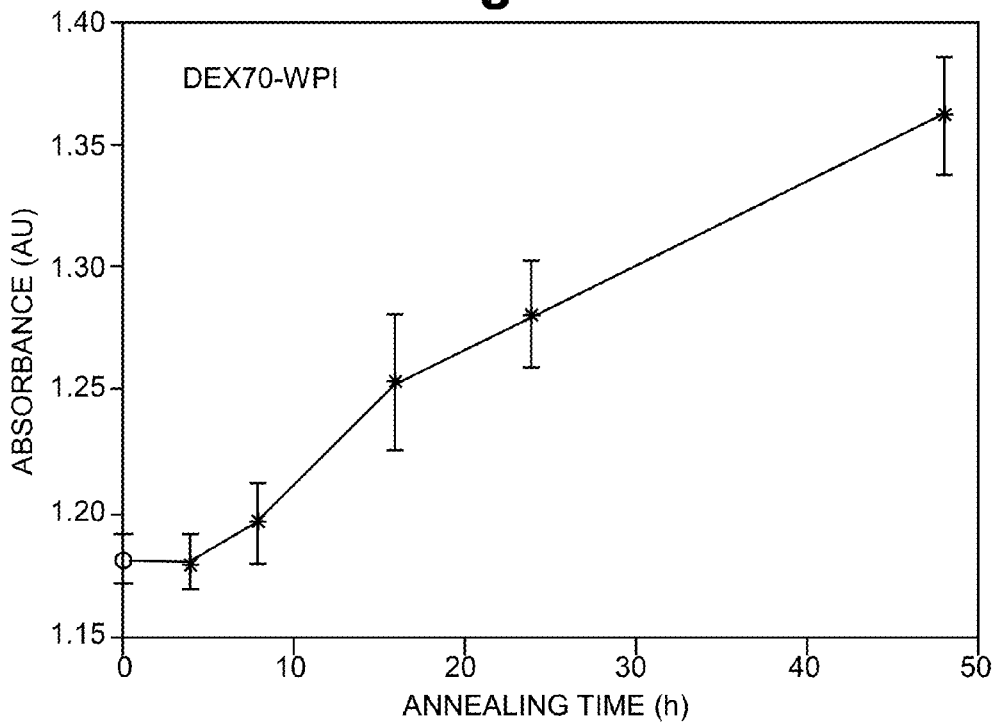
FIG. 23B shows the relationship between absorbance peak at 282 nm of electrospun samples and annealing time (WPI and dextran 70 kDa samples).

WPI concentration was kept constant in every solution sample; therefore, the increase in absorbance may be due to larger size of glycoproteins compared to native WPI molecules. This indicated that longer annealing time promoted more glycoprotein formation. The plot between absorbance peak and annealing time looks similar to a sigmoid curve. At the beginning of annealing, dextran and WPI molecules might need relaxation periods to realign themselves thus there was just slightly an increase in glycoprotein formation (0-4 h). After this initial relaxation period, glycosylation may proceed at a faster rate from 4 h to 24 h). Between 24 h and 48 h, the rate of glycosylation slowed, likely due to a decrease in reaction sites. Similar trends were also observed in electrospun films prepared from dextran 70 kDa (FIGS. 23A and 23B).

Figure 24A:
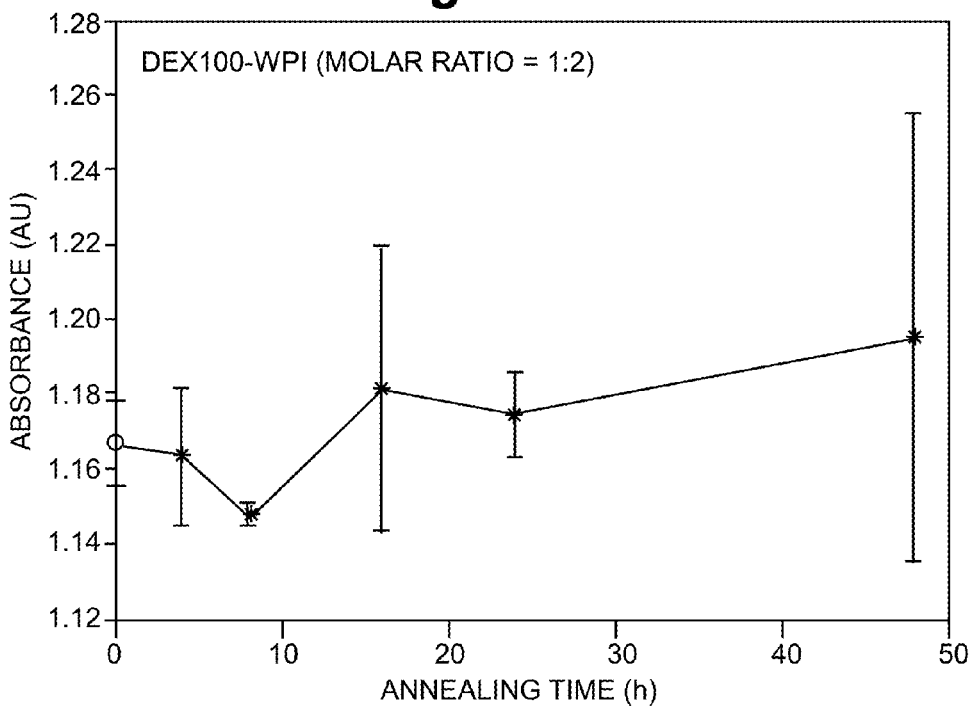
FIGS. 24A and 24B shows the effect of solution concentration on UV absorbance of electrospun samples prepared from mixtures of WPI and dextran 100 kDa.

In contrast, electrospun films prepared from dextran 100 kDa-WPI with a mixing ratio of 1:2 displayed an unusual fluctuation in UV absorbance. (FIG. 24A). Results from gel electrophoresis experiments confirmed that there was an increase in glycoproteins over time, regardless of dextran size; thus, the fluctuation may have been due to the measurement itself. Since all solutions were prepared at the same concentration as solutions prepared from dextran 40 kDa- and dextran 70 kDa-electrospun films, we suspect that larger size of dextran molecules and/or glycoproteins might interfere with light absorbance.

Figure 24B:
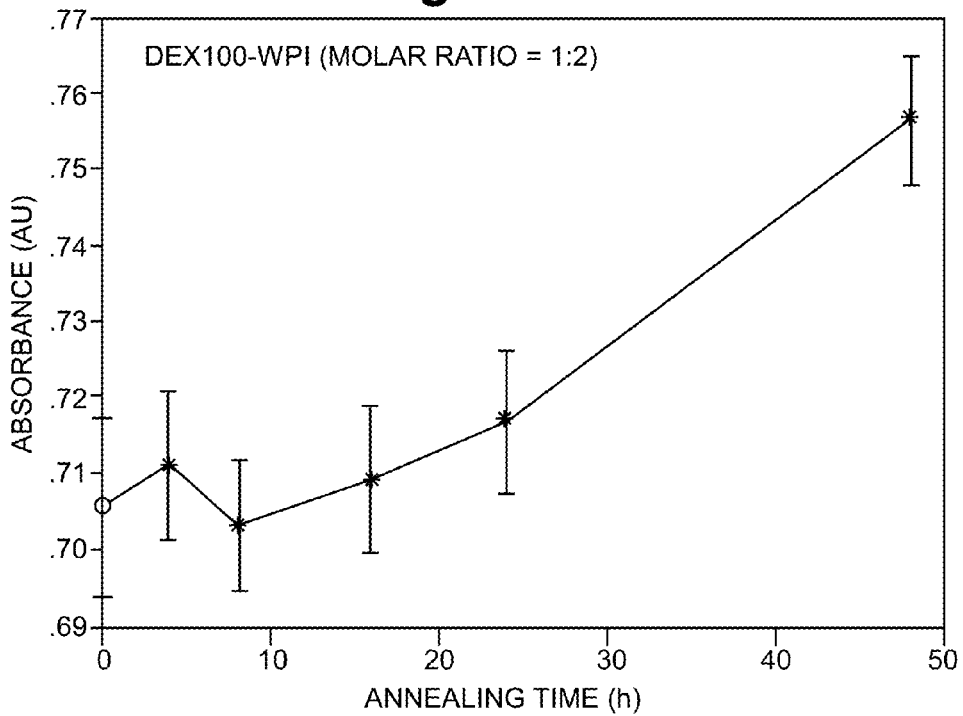
Figure 26:
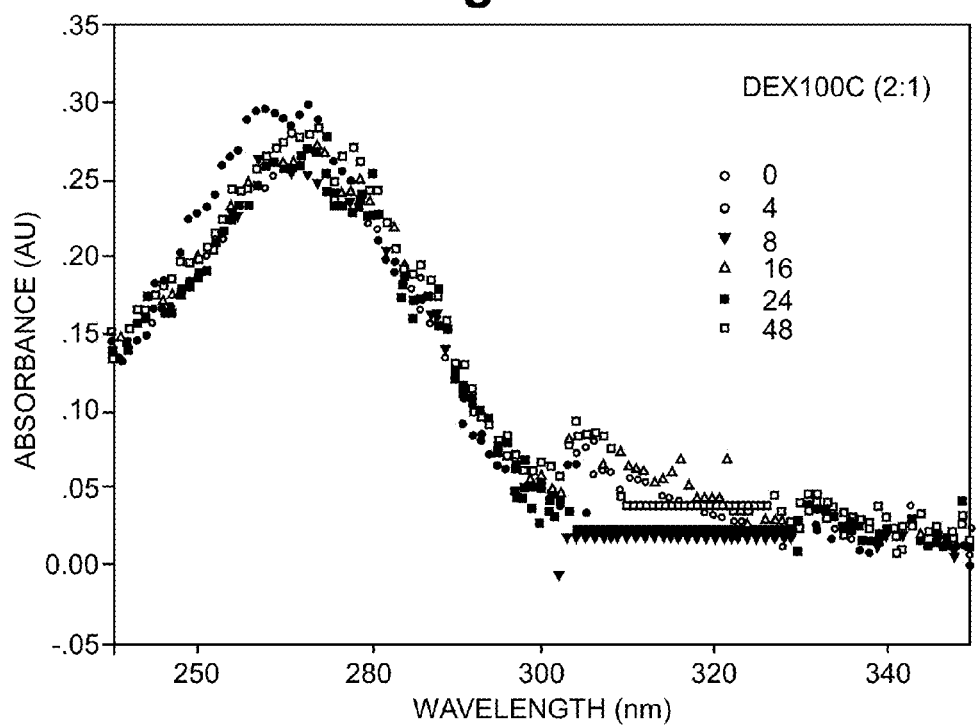
FIG. 26 shows UV absorbance spectra of electrospun samples prepared from mixtures of dextran 100 kDa and WPI with a mixing ratio of 2:1.
Figure 27:
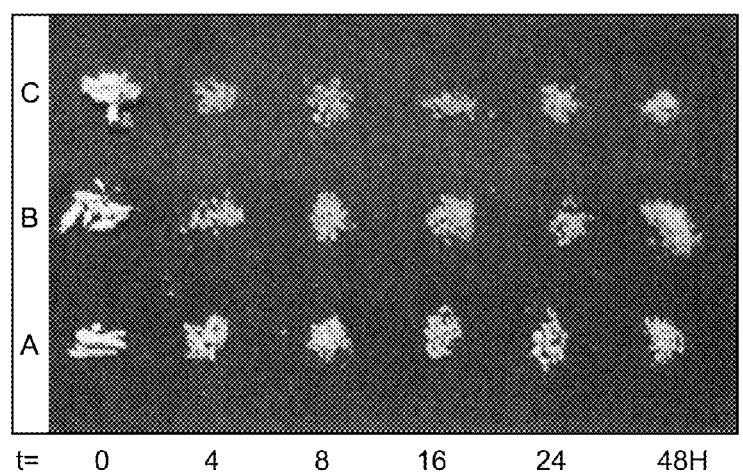
FIG. 27 shows the electrospun films prepared from WPI and dextran 100 kDa with different mixing ratios: A) 1:2; B) 1:1; and C) 2:1 (mixing ratio between dextran and WPI)

Solutions were therefore prepared at lower concentration, from 5 to 3 mg/mL. It seemed that the interference effect of molecule size on light absorbance was reduced. FIG. 24B shows a similar trend to FIGS. 22B and 23B. However, when the mixing ratio between dextran-100 kDa and WPI increased to 1:1 the interference effect returned (FIG. 25A). And increasing the mixing ratio to 2:1 resulted in more interference (FIG. 25B). High levels of noise were observed in every measurement (FIG. 26). These results were in contrast with gel electrophoresis results or even simple visual observations (FIG. 27), that showed formation of colored product.

Example 12

Colorimeter Analysis

Figure 28A:
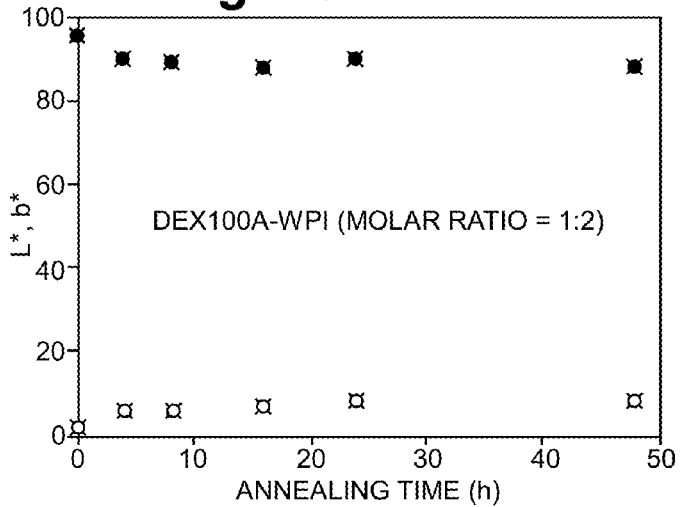
FIGS. 28 A-C illustrate lightness (filled circle) and yellowness (unfilled circle) of electrospun films measured using a colorimeter at mixing rations of 1:2 (A), 1:1 (B), and 2:2 (C).
Figure 28B:
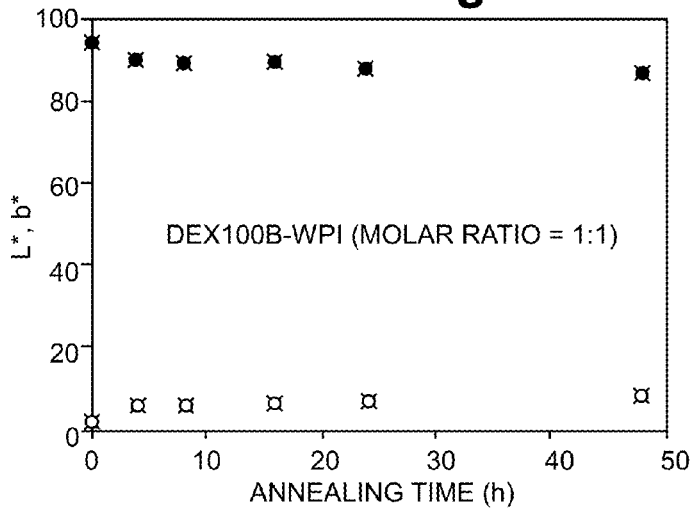
Figure 28C:
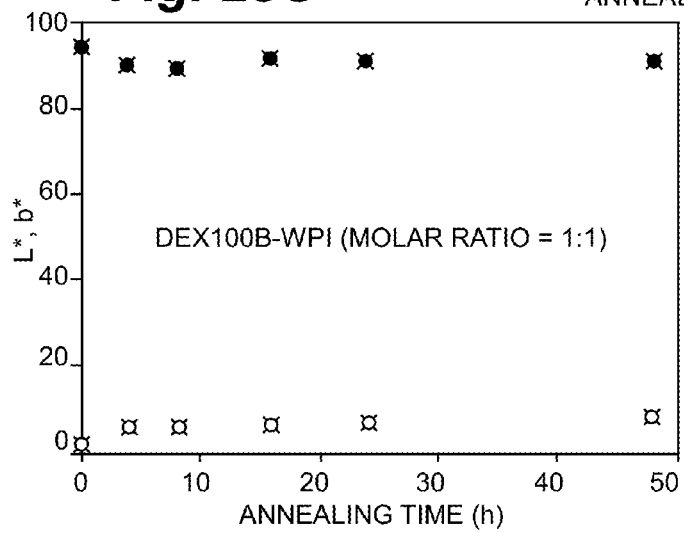

Annealed electrospun film containing WPI-dextran fibers was prepared and annealed as described above. A colorimeter was used to assess color development of annealed electrospun films those produced from dextran 100 kDa. As expected, the lightness of the sample decreased while yellowness increased with annealing time (FIG. 28A-C). The less color, e.g. less yellow or brown, is better. Ideally the films are colorless. The reactions could be stopped after the Schiff reaction to avoid color.

Example 13

NIR Spectra Analysis

Figure 15:
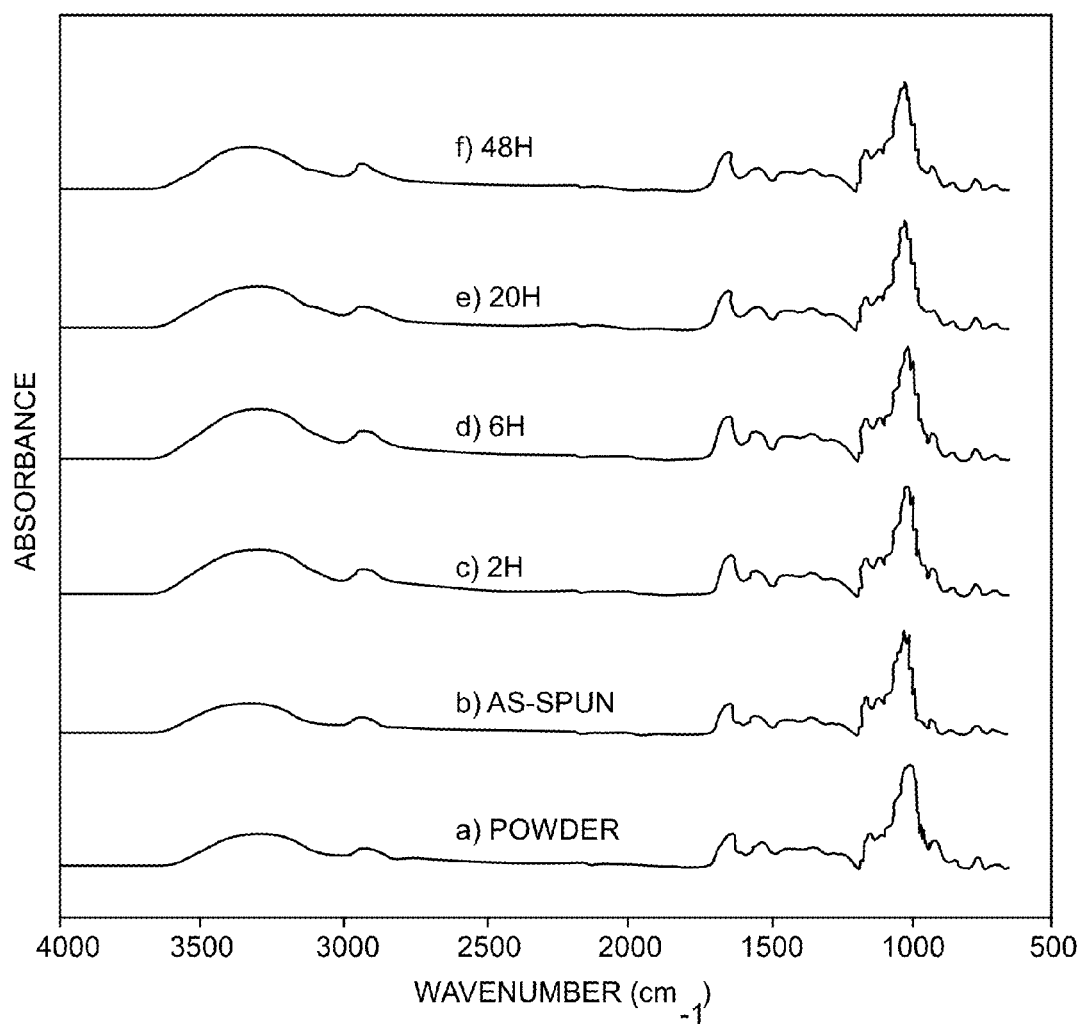
FIG. 15 illustrates IR spectra of: a) WPI-dextran in powder form; b) as-spun WPI-dextran electrospun film; c) to f) WPI-dextran electrospun films after annealed at 60° C. and 74% RH for 2, 6, 20 and 48 hours, respectively.

NIR spectra of electrospun films prepared from WPI and dextran 100 kDa and annealed at different time were collected (FIGS. 29A and B). We did not detect a new absorbance peak in a range of 2000 to 2300 nm, which were assigned to secondary structures of protein molecules [20, 22]. This might indicate that there was no substantial change in protein's secondary structures during annealing at 60° C. This result agreed with the FTIR spectra of as-spun and annealed electrospun films (FIG. 15). A peak observed located around 1400 nm which could be attributed to first overtone of O—H stretching due to the presence of water during annealing in high humidity environment and N—H stretching of protein molecules [20, 23]. Overall, reflectance of annealed electrospun films shifted lower. This was because annealed electrospun films became slightly lower in lightness with longer annealing time; resulted in higher ability to absorb light. All spectra of annealed electrospun films show lower reflectance values (or the higher absorbance) at around 280 nm compare to as-spun films. Generally, the darker the film, the more problematic the film and it is difficult to achieve FTIR analysis.

As another example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method of preparing a conjugated polysaccharide-whey protein fiber via electro-spinning comprising steps of
   preparing an aqueous solution comprising a polysaccharide and a whey protein, wherein the polysaccharide is present at concentration of 0.1 g/mL to about 5.0 g/mL,
   applying a voltage of 15 to 25 kV to the solution,
   collecting the fiber on a collecting plate.
2. The method of claim 1 wherein the electro-spinning is needleless.
3. The method of claim 1 wherein the polysaccharide has an aldehyde group or forms an aldehyde group through isomerism.
4. The method of claim 1 wherein the polysaccharide is a dextran.
5. The method of claim 4 wherein the dextran molecular weight is between about 10 kDa and about 500 kDa.
6. The method of claim 1 wherein the whey protein is a whey protein isolate (WPI).
7. The method of claim 1 wherein the aqueous solution comprises polysaccharide and whey protein at a mixing ratio (w/w) from 50:1 to 1:50.
8. The method of claim 1 wherein the aqueous solution comprises polysaccharide and whey protein at a mixing ratio (w/w) from 3:1 to 1:10.
9. The method of claim 1 wherein the aqueous solution comprises dextran and WPI.
10. The method of claim 1 further comprising the step of incubating the fiber at a relative humidity of at least 45%, for up to 24 hours, whereby a conjugated film is formed.
11. The method of claim 10 wherein the relative humidity is between 65% and 75%.
12. The method of claim 10 wherein the temperature is in the range of 10-70° C.
13. The method of claim 1 wherein the fiber diameter is about 100 nm to about 500 nm.
14. The method of claim 13 wherein the fiber diameter is about 150 nm to about 250 nm.
15. A method of preparing a conjugated polysaccharide-protein fiber film by electro-spinning comprising steps of
   preparing an aqueous solution comprising 100 kDa dextran and a whey protein isolate, wherein the dextran and the whey protein isolate are present in a mixing ratio (w/w) between 3:1 and 10:1,
   applying a voltage of 15 to 25 kV to the solution whereby a fiber is created,
   collecting the fiber on a collecting plate, and
   incubating the fiber at a relative humidity of at least 45% for between 4 and 24 hours, whereby a conjugated film is formed.
16. The method of claim 15 wherein the relative humidity is between 65% and 75%.
17. The method of claim 15 wherein the incubation is between 4 and 8 hours.
18. The method of claim 15 wherein the temperature is in the range of 10-70° C.
19. The method of claim 15 wherein the electro-spinning is needleless.

* * * * *